(12) United States Patent
Park

(10) Patent No.: US 11,762,215 B2
(45) Date of Patent: Sep. 19, 2023

(54) LENS DRIVING APPARATUS, CAMERA MODULE AND OPTICAL DEVICE

(71) Applicant: LG INNOTEK CO., LTD., Seoul (KR)

(72) Inventor: Sang Ok Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 572 days.

(21) Appl. No.: 16/644,126

(22) PCT Filed: Sep. 28, 2018

(86) PCT No.: PCT/KR2018/011499
§ 371 (c)(1),
(2) Date: Mar. 3, 2020

(87) PCT Pub. No.: WO2019/066530
PCT Pub. Date: Apr. 4, 2019

(65) Prior Publication Data
US 2020/0409166 A1  Dec. 31, 2020

(30) Foreign Application Priority Data

Sep. 29, 2017 (KR) .......................... 10-2017-0128236

(51) Int. Cl.
*G02B 27/64* (2006.01)
*G02B 7/09* (2021.01)
*H04N 23/51* (2023.01)
*G03B 13/36* (2021.01)

(52) U.S. Cl.
CPC .............. *G02B 27/64* (2013.01); *G02B 7/09* (2013.01); *H04N 23/51* (2023.01); *G03B 13/36* (2013.01)

(58) Field of Classification Search
CPC ......... H04N 5/2252; G02B 7/09; G02B 27/64
See application file for complete search history.

(56) References Cited

U.S. PATENT DOCUMENTS

2013/0050828 A1  2/2013  Sato et al.
2013/0135762 A1*  5/2013  Lee .......................... G02B 7/08
359/824

(Continued)

FOREIGN PATENT DOCUMENTS

| CN | 106575026 A | 4/2017 |
| CN | 107015421 A | 8/2017 |
| CN | 107102495 A | 8/2017 |

(Continued)

*Primary Examiner* — Noam Reisner
(74) *Attorney, Agent, or Firm* — Birch, Stewart, Kolasch & Birch, LLP

(57) ABSTRACT

The present embodiment relates to a lens driving apparatus, a camera module comprising the lens driving apparatus, and an optical device comprising the camera module. The lens driving apparatus comprises: a base; a first substrate placed on the base; a housing placed on the first substrate; a bobbin placed inside the housing; a lower resilient member for coupling the bobbin and the housing; a first coil placed on the bobbin; a magnet placed on the housing and facing the first coil; and a second substrate placed on the first substrate and comprising a second coil which faces the magnet, wherein the lower resilient member is connected to the first substrate or the second substrate.

20 Claims, 24 Drawing Sheets

(56) References Cited

U.S. PATENT DOCUMENTS

2016/0191754 A1* 6/2016 Cho .................. H04N 5/2257
348/357
2016/0274375 A1* 9/2016 Park ..................... G02B 7/02

FOREIGN PATENT DOCUMENTS

| KR | 10-2012-0053838 A | 5/2012 |
| KR | 10-1640565 B1 | 7/2016 |
| KR | 10-1650022 B1 | 8/2016 |
| KR | 10-2017-0002803 A | 1/2017 |
| KR | 10-2017-0067261 A | 6/2017 |
| KR | 10-2017-0083755 A | 7/2017 |

\* cited by examiner

LENS DRIVING APPARATUS, CAMERA MODULE AND OPTICAL DEVICE

CROSS REFERENCE TO RELATED APPLICATIONS

This application is the National Phase of PCT International Application No. PCT/KR2018/011499, filed on Sep. 28, 2018, which claims priority under 35 U.S.C. 119(a) to Patent Application No. 10-2017-0128236, filed in the Republic of Korea on Sep. 29, 2017, all of which are hereby expressly incorporated by reference into the present application.

TECHNICAL FIELD

The present embodiment relates to a lens driving device, a camera module and an optical apparatus.

BACKGROUND ART

The following description provides background information for the present embodiment and does not describe the prior art.

As various portable terminals are widely spread and commonly used, and wireless Internet services has been commercialized, the demands of consumer related to portable terminals have been diversified and various kinds of additional devices have been installed in portable terminals.

Among them, there is a camera module for photographing a subject as a photograph or a moving picture. Recently, camera modules with an auto focus function, which automatically adjusts the focus according to the distance of the subject, or an optical image stabilization function that moves or tilts the lens module in a direction perpendicular to the optical axis direction to cancel vibration (movement) generated in the image sensor by an external force are emerging.

However, in order to be equipped with the autofocus function and the optical image stabilization function, there is a problem that due to the increase in the number of parts and the complicated coupling relationship, the manufacturing process of the camera module becomes complicated and the price is increasing.

DETAILED DESCRIPTION OF THE INVENTION

Technical Subject

The present embodiment provides a camera module having a compact structure, and at the same time capable of performing both an autofocus function and an optical image stabilization function.

Technical Solution

A lens driving device according to the present embodiment comprises a housing; a bobbin disposed within the housing; a first coil disposed on the bobbin; a magnet disposed in the housing and facing the first coil; a base disposed on one side of the housing; a substrate comprising a second coil facing the magnet and disposed on the base; and a lower elastic member connecting the bobbin and the housing, wherein the lower elastic member may be connected to the substrate.

The substrate may comprise a first substrate disposed on the base, and a second substrate comprising the second coil and disposed on the first substrate.

The lower elastic member may comprise two lower elastic members, and the two lower elastic members may electrically connect the first substrate and the first coil.

The lower elastic member may comprise: a first coupling portion coupled to the bobbin; a second coupling portion coupled to the housing; a first connecting portion connecting the first coupling portion and the second coupling portion; a second connecting portion connecting the second coupling portion and the substrate.

The first coupling portion is disposed inner side of the second coupling portion, wherein the second connecting portion may comprise: a second-first connecting portion extending from a first corner of the housing to corresponding a first corner of the substrate; a second-second connecting portion extending from a second corner of the housing to corresponding a second corner of the substrate; a second-third connecting portion extending from a third corner of the housing to corresponding a third corner of the substrate; and a second-fourth connecting portion extending from a fourth corner of the housing to corresponding a corresponding fourth corner of the substrate.

The lower elastic member comprises a first lower elastic member and a second lower elastic member; the second-first connecting portion and the second-second connecting portion are disposed in the first lower elastic member; and the second-third connecting portion and the second-fourth connecting portion may be disposed in the second lower elastic member.

The lens driving device according further comprises: a sensing magnet disposed in the bobbin; a third substrate disposed in the housing; a Hall sensor integrated driver IC disposed on the third substrate and facing the sensing magnet; and an upper elastic member for connecting the upper portion of the bobbin and the upper portion of the housing, wherein the lower elastic member comprises four lower elastic members, the upper elastic member comprises two upper elastic members, the third substrate comprises four lower terminals disposed below the third substrate, and two upper terminals disposed above the third substrate, the four lower elastic members electrically connect the four lower terminals of the substrate and the third substrate, and the two upper elastic members may electrically connect the two upper terminals of the first coil and the third substrate.

A camera module according to the present embodiment may comprises: a printed circuit board; an image sensor disposed in the printed circuit board; a lens driving device; and a lens coupled to the bobbin of the lens driving device.

An optical apparatus according to the present embodiment may comprise a camera module. The optical apparatus may be a smartphone.

A lens driving device according to the present embodiment may comprise: a housing; a bobbin disposed inside the housing; a first coil disposed on the bobbin; a magnet disposed in the housing and facing the first coil; a base disposed on one side of the housing; a substrate comprising a second coil facing the magnet and disposed on the base; an elastic member connecting the bobbin and the housing; and a support elastic member connecting the lower surface of the housing and the substrate.

A lens driving device of this embodiment may comprise: a base; a first substrate disposed on the base; a housing disposed on the substrate; a bobbin disposed inside the housing; a lower elastic member coupling the bobbin and the housing; a first coil disposed on the bobbin; a magnet disposed in the housing and facing the first coil; and a second substrate disposed on the first substrate and comprising a second coil facing the magnet, wherein the lower elastic member may be connected to any one of the first substrate and the second substrate.

The lower elastic member may resiliently connect the bobbin and the housing to support the bobbin, and resiliently connect the housing and the substrate to support the housing.

The first coil is electrically connected to the lower elastic member, the lower elastic member may be electrically connected to the first substrate, and the substrate may apply power to the first coil.

The lower elastic member may comprise: a first coupling portion for coupling with the bobbin; a second coupling portion coupled to the housing; a first connecting portion connecting the first coupling portion and the second coupling portion; and a second connecting portion connecting the second coupling portion and the first substrate.

The first coupling portion is disposed inner side of the second coupling portion, and the second connecting portion may comprise: a second-first connecting portion extending from a first corner of the housing to a first corner of the substrate; a second-second connecting portion extending from a second corner of the housing to a second corner of the substrate; a second-third connecting portion extending from a third corner of the housing to a third corner of the substrate; and a second-fourth connecting portion extending from a fourth corner of the housing to a corresponding fourth corner of the substrate.

The lower elastic member is separated into a first lower elastic member and a second lower elastic member spaced apart from each other, the second-first connecting portion and the second-second connecting portion are located on the first lower elastic member, and the second-third connecting portion and the second-fourth connecting portion may be located on the second lower elastic member.

In addition, the lens driving device of the present embodiment comprises: a base; a first substrate disposed on the base; a housing disposed on the first substrate; a bobbin disposed inside the housing; an upper elastic member coupling the bobbin and the housing; a first coil disposed on the bobbin; a magnet disposed in the housing and facing the first coil; a second substrate disposed on the first substrate and comprising a second coil facing the magnet; a support elastic member disposed between the housing and the substrate and electrically connected to the first coil, wherein the support elastic member may be connected to any one of the first substrate and the second substrate.

The support elastic member may comprise a support portion for supporting the housing and an extension portion extending from the support portion to the first substrate to be coupled to the first substrate;

The first coil is electrically connected to the lower elastic member, the lower elastic member is electrically connected to the support elastic member, the support elastic member is electrically connected to the substrate, and the substrate may apply power to the first coil.

The support portion may be in the form of a plate and located inner side of the extension portion.

The extension portion may comprise: a first extension portion extending from a first corner of the support portion to a fourth corner of the substrate; a second extension portion extending from the second corner of the support portion to the first corner of the substrate; a third extension portion extending from the third corner of the support portion to the second corner of the substrate; and a fourth extension portion extending from the fourth corner of the support portion to the third corner of the substrate.

The support portion comprises a first support portion and a second support portion spaced apart from each other, the first extension portion and the fourth extension portion is located in the first support portion, and the second extension portion and the third extension portion may be located on the second support portion.

The lens driving device of the present embodiment comprises a base; a first substrate disposed on the base; a housing disposed on the substrate; a bobbin disposed inside the housing; an upper elastic member disposed on the housing and the bobbin; a lower elastic member disposed between the housing and the substrate; a first coil disposed on the bobbin; a sensing magnet disposed in the bobbin; a magnet disposed in the housing and facing the first coil; a position sensor disposed in the housing, the position sensor facing the sensing magnet; and a second substrate disposed on the first substrate and comprising a second coil facing the magnet, wherein the lower elastic member may be coupled to the bobbin, the housing, and the first substrate.

The first coil is electrically connected to the upper elastic member, the upper elastic member is electrically connected to the position sensor, the position sensor is electrically connected to the lower elastic member, the lower elastic member is electrically connected to the first substrate, and the first substrate may apply power to the first coil.

A support elastic member disposed between the lower elastic member and the substrate is further comprised, and the support elastic member may comprise a support portion supporting the housing and an extension portion extending from the support portion to the first substrate to be coupled to the first substrate.

A lens driving device of this embodiment my comprise a base; a first substrate disposed on the base; a housing disposed on the first substrate; a bobbin disposed inside the housing; a lower elastic member coupling the bobbin and the housing; a first coil disposed on the bobbin; a magnet disposed in the housing and facing the first coil; a second substrate disposed on the first substrate and comprising a second coil facing the magnet; and a resilient unit extending from the lower elastic member and connected to any one of the first substrate and the second substrate.

Advantageous Effects

The present embodiment provides a camera module having a compact structure, and capable of performing both an autofocus function and an optical image stabilization function.

BEST MODE

Figure 1:
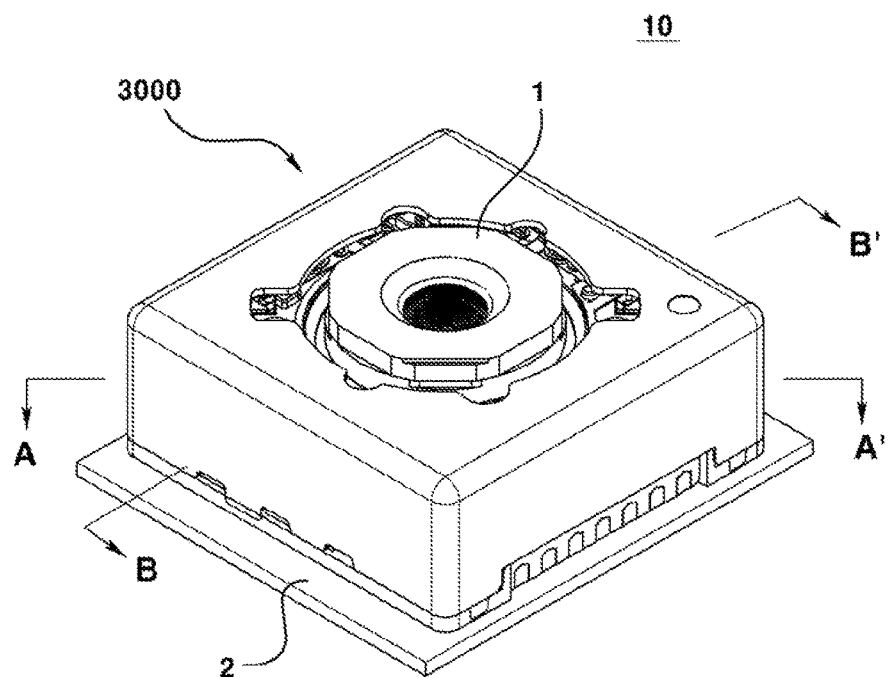
FIG. 1 is a perspective view showing a camera module of the present embodiment.

Hereinafter, some embodiments of the present invention will be described with reference to exemplary drawings. In describing the reference symbols of the components in the drawings, the same components are denoted by the same reference numerals whenever possible, even if they are shown on other drawings. In addition, in describing the embodiments of the present invention, when it is determined that a detailed description of a related well-known configuration or function interferes with the understanding of the embodiments of the present invention, the detailed description thereof will be omitted.

In describing the components of the embodiment of the present invention, terms such as first, second, A, B, (a), and (b) may be used. These terms are merely intended to distinguish the components from other components, and the terms do not limit the nature, order or sequence of the components. When a component is described as being "connected", "coupled", or "jointed" to another component, the component may be directly connected, coupled, or jointed to the other component, however, it should be understood that another element may be "connected", "coupled" or "jointed" between components.

The "optical axis direction" used below is defined as the optical axis direction of the lens module in a state coupled to the lens driving device. On the other hand, the "optical direction" may be used interchangeably with the "up and down direction", "vertical direction", "z-axis direction" and the like.

The "auto focus function" used below is defined as the function that automatically focuses on the subject by moving the lens in the direction of the optical axis according to the distance of the subject so that clear images of the subject can be obtained on the image sensor. Meanwhile, 'auto focus' can be used interchangeably with 'AF (Auto Focus)'.

The "image stabilization function" used below is defined as a function of moving or tilting a lens module in a direction perpendicular to the optical axis direction so as to cancel a vibration (movement) generated in an image sensor by an external force. Meanwhile, "image stabilization" may be used interchangeably with "OIS (Optical Image Stabilization)".

A first corner C1-1 of the housing and a first corner C2-1 of the substrate and a first corner C3-1 of the base, and a first corner C4-1 of the support elastic member may be located to correspond in the vertical direction. Also, a second corner C1-2 of the housing, a second corner C2-2 of the substrate, a second corner C3-2 of the base, and a second corner C4-2 of the support elastic member may be located to correspond in the vertical direction. Also, a third corner C1-3 of the housing, a third corner C2-3 of the substrate, a third corner C3-3 of the base, and a third corner C4-3 of the support elastic member may be located to correspond in the vertical direction. Also, a fourth corner C1-4 of the housing, a fourth corner C2-4 of the substrate, a fourth corner C3-4 of the base, and a fourth corner C4-4 of the support elastic member may be located to correspond in the vertical direction.

Hereinafter, the configuration of the optical apparatus according to the present embodiment will be described. The optical apparatus according to the present embodiment comprises a hand phone, a mobile phone, a smart phone, a portable smart device, a digital camera, a laptop computer, a digital broadcasting terminal, a personal digital assistant (PDA), and a portable multimedia player (PMP), navigation, and the like, but is not limited thereto. Any device for taking images or photographs may be used. The optical apparatus according to the present embodiment may comprise a main body (not shown), a display panel (not shown) disposed on one side (one surface) of the main body to display information, and a camera module 10 disposed inside the main body for taking images or photographs. The camera module 10 is electrically connected to the display panel so that an image or a picture taken by the camera module 10 can be reproduced on the display panel.

Figure 2:
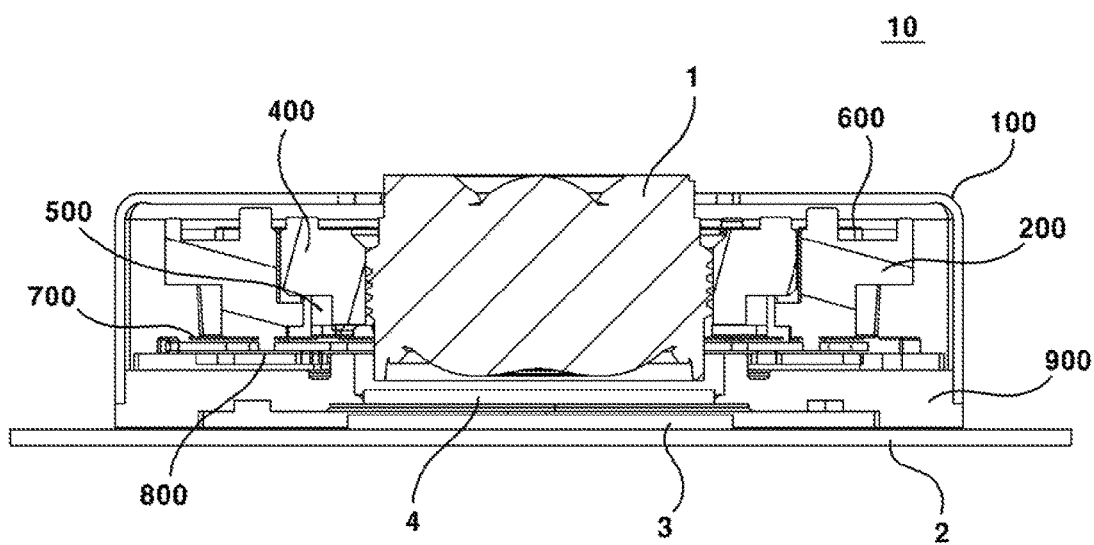
FIG. 2 is a cross-sectional view of the camera module of the present embodiment taken along the line A-A'.
Figure 3:
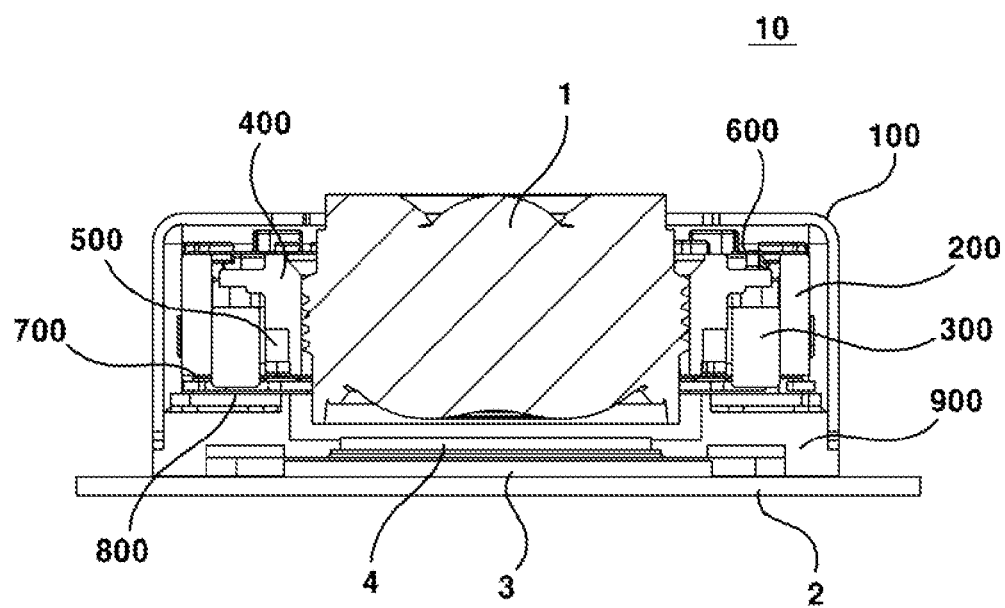
FIG. 3 is a cross-sectional view of the camera module of the present embodiment taken along the line B-B'.

Hereinafter, the configuration of the camera module according to the present embodiment will be described with reference to the drawings. FIG. 1 is a perspective view showing a camera module of the present embodiment; FIG. 2 is a cross-sectional view of the camera module of the present embodiment taken along the line A-A'; and FIG. 3 is a cross-sectional view of the camera module of the present embodiment taken along the line B-B'.

Although the drawings show a camera module mounted with the lens driving device 3000 of the third embodiment, this may be inferred to be applied to the camera module on which lens driving devicees 1000, 2000, 4000, and 5000 of the first, second, fourth, and fifth embodiments are mounted.

The camera module of the present embodiment may comprise a lens module 1, an infrared cut filter 4, a main substrate 2, an image sensor 3, a control unit (not shown), and lens driving devicees 1000, 2000, 3000, 4000, and 5000.

The lens module 1 may comprise a lens and a lens barrel. The lens module 1 may comprise one or more lenses (not shown) and a lens barrel that accommodates one or more lenses. However, one configuration of the lens module 1 is not limited to the lens barrel, and any structure may be used as long as the holder structure can support one or more lenses. The lens module 1 may be coupled to the lens driving devicees 1000, 2000, 3000, 4000, and 5000 to move together with the lens driving devicees 1000, 2000, 3000, 4000, and 5000. The lens module 1 may be disposed inside the bobbin 400 of the lens driving devicees 1000, 2000, 3000, 4000, and 5000 as an example. In this case, the inner circumferential surface of the lens module 1 and the bobbin 400 may be in contact with each other. As an example, the lens module 1 may be screw-coupled with the bobbin 400 of the lens driving devicees 1000, 2000, 3000, 4000, and 5000. The lens module 1 may be coupled to the bobbin 400 of the lens driving devicees 1000, 2000, 3000, 4000, and 5000 by an adhesive (not shown). Meanwhile, light passing through the lens module 1 may be irradiated to the image sensor 3.

An infrared cut filter 4 may block the light of the infrared region from being incident on the image sensor 3. The infrared cut filter 4 may be located between the lens module 1 and the image sensor 3 as an example. The infrared cut filter 4 may be located in a holder member (not shown) provided separately from a base 910. However, the infrared cut filter 4 may be mounted in a hole formed in the center portion of the base 910. As an example, the infrared cut filter 4 may be formed of a film material or a glass material. As an example, the infrared cut filter 4 may be formed by coating an infrared cut-off coating material on an optical filter in the shape of a plate such as a cover glass for protecting an image pickup surface or a cover glass.

The main substrate 2 may be a printed circuit board (PCB). The main substrate 2 may support the lens driving devicees 1000, 2000, 3000, 4000, and 5000. The image sensor 3 may be mounted on the main substrate 2. As an example, the image sensor 3 may be located inside the upper surface of the main substrate 2, and a sensor holder (not shown) may be located outside the upper surface of the main substrate 2. The lens driving devicees 1000, 2000, 3000, 4000, and 5000 may be located above the sensor holder. Alternatively, the lens driving devicees 1000, 2000, 3000, 4000, and 5000 may be located outside the upper surface of the main substrate 2, and the image sensor 3 may be located inside the upper surface of the main substrate 2. Through this structure, the light passing through the lens module 1 accommodated inside the lens driving devicees 1000, 2000, 3000, 4000, and 5000 may be irradiated to the image sensor 3 mounted on the main substrate 2. The main substrate 2 may supply power to the lens driving devicees 1000, 2000, 3000, 4000, and 5000. Meanwhile, a control unit for controlling the lens driving devicees 1000, 2000, 3000, 4000, and 5000 may be located on the main substrate 2.

The image sensor 3 may be mounted on the main substrate 2. The image sensor 3 may be located so that the optical axis is coincide with the lens module 1. Through this, the image sensor 3 may acquire the light passing through the lens module 1. The image sensor 3 may output the irradiated light as an image. The image sensor 3 may be, for example, a charge coupled device (CCD), a metal oxide semi-conductor (MOS), a CPD, and a CID. However, the type of the image sensor 3 is not limited thereto.

The control unit may be mounted on the main substrate 2. The control unit may be located outer side of the lens driving devicees 1000, 2000, 3000, 4000, and 5000. However, the control unit may be located inside the lens driving devicees 1000, 2000, 3000, 4000, and 5000. The control unit may control the direction, intensity, amplitude, and the like of the current to be supplied to each of the components of the lens driving devicees 1000, 2000, 3000, 4000, and 5000. The control unit may control the lens driving devicees 1000, 2000, 3000, 4000, and 5000 to perform at least one of an autofocus function and an optical image stabilization function of the camera module 10. That is, the control unit may control the lens driving devicees 1000, 2000, 3000, 4000, and 5000 to move the lens module 1 in the optical axis direction, or move or tilt the lens module 1 in a direction perpendicular to the optical axis direction.

Further, the control unit may perform feedback control of the autofocus function and the optical image stabilization function. More specifically, the control unit receives the position of the bobbin 400 or the housing 200 detected by the sensor 940 to control the power or current applied to the first coil 500 to the second coil 930, so that precise autofocus function and image stabilization function can be provided.

Hereinafter, the lens driving device of the present embodiment will be described. The lens driving devicees 1000, 2000, 3000, 4000, and 5000 of the present embodiment may perform the auto focus function (AF function) by moving the bobbin 400 in the optical axis direction (up and down, vertical direction) due to the electromagnetic interaction between the magnet 300 and the first coil 500. In this case, the bobbin 400 is provided with a driving force by the electromagnetic interaction of the magnet 300 and the first coil 500, and can be moved in both upper and lower directions. Furthermore, in the lens driving devicees 1000, 2000, 3000, 4000, and 5000 of the present embodiment, the housing 200 moves in a direction perpendicular to the optical axis direction due to the electromagnetic interaction between the magnet 300 and the second coil 930, or tilted to perform optical image stabilization (OIS). In this case, the housing 200 may be provided with a driving force by electromagnetic interaction between the magnet 300 and the second coil 930.

The lens driving device of this embodiment may have a first embodiment, a second embodiment, a third embodiment, a fourth embodiment, and a fifth embodiment. In the first, second and third embodiments, the position sensor 980 is omitted. In the fourth and fifth embodiments, the position sensor 980 is present. The position sensor 980 may detect the position of the bobbin 400. Therefore, the lens driving devicees 4000 and 5000 of the fourth and fifth embodiments may feedback the position information of the bobbin 400, and then based on this, a precise autofocus function can be performed.

First, the lens driving devicees 1000, 2000, and 3000 in the first, second and third embodiments will be described. In the lens driving device 1000 of the first embodiment, a support elastic member 800 is omitted (see FIG. 4), and in the lens driving device 2000 of the second embodiment, the lower elastic member 700 is omitted. (See FIG. 5), the lens driving device 3000 of the third embodiment is a case where both the lower elastic member 700 and the support elastic member 800 exist (see FIG. 6).

Figure 4:
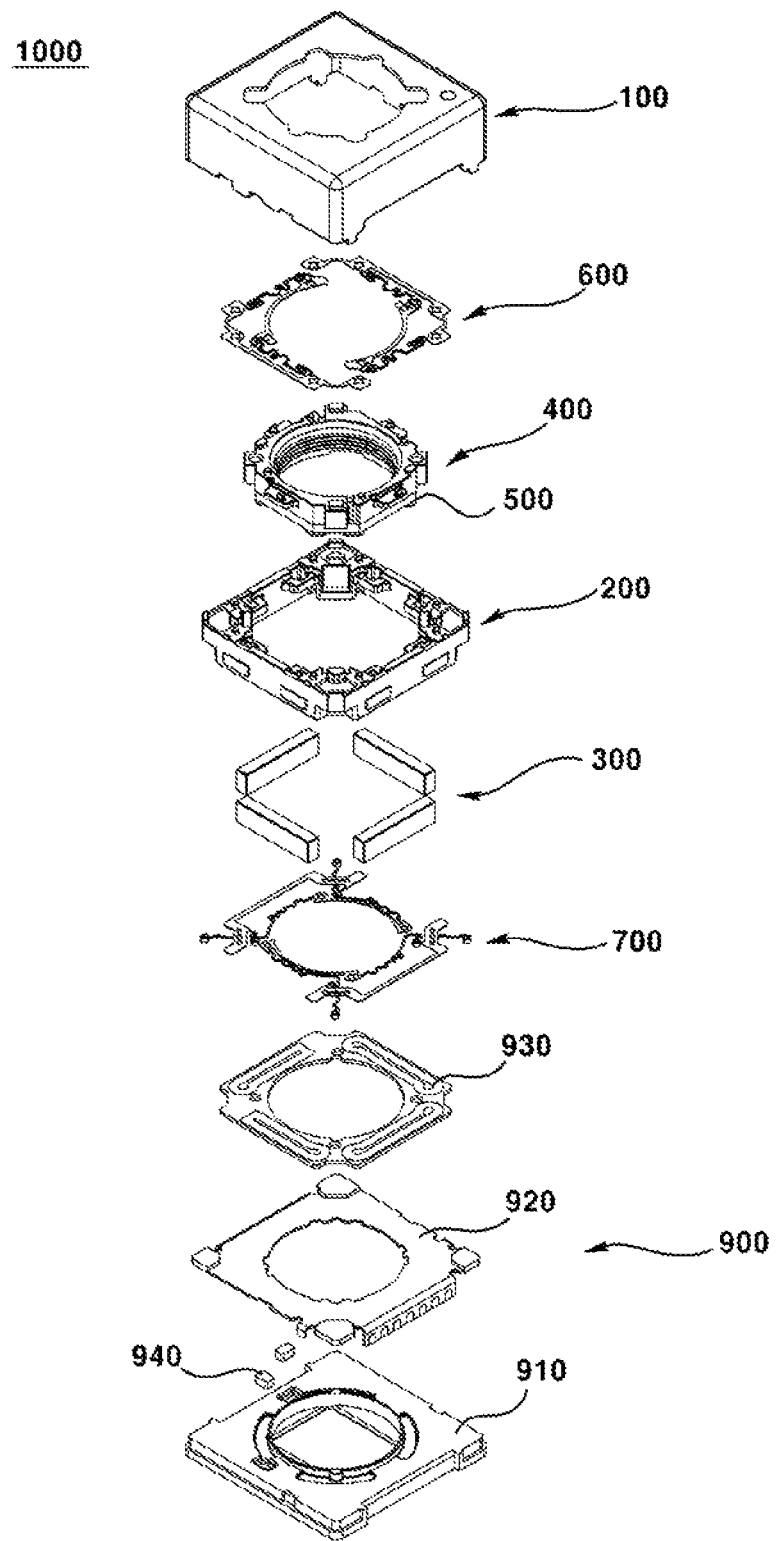
FIG. 4 is an exploded perspective view showing the lens driving device of the first embodiment.
Figure 7:
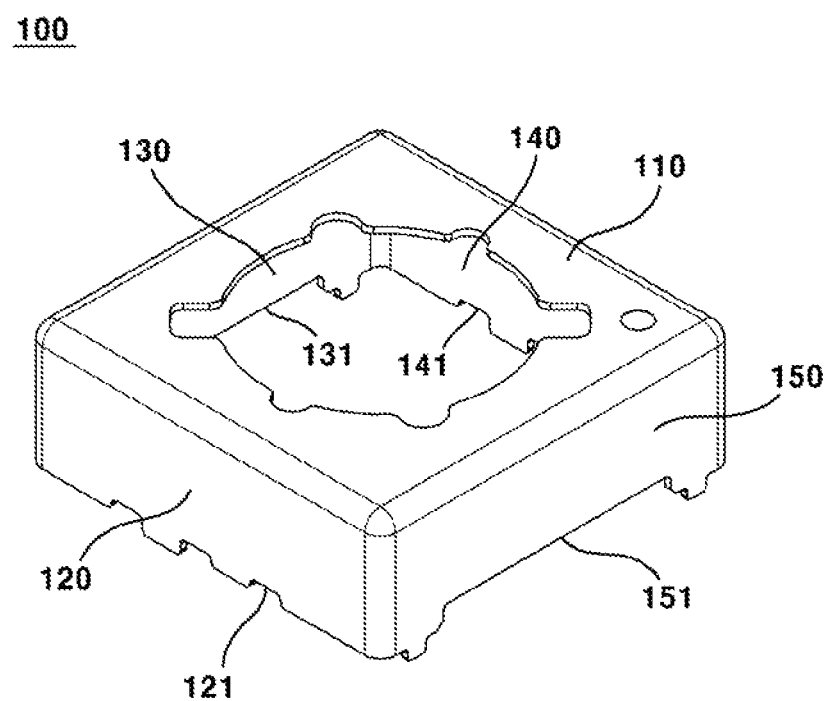
FIG. 7 is a perspective view showing a cover applied to the first, second, third, fourth, and fifth embodiments.
Figure 8:
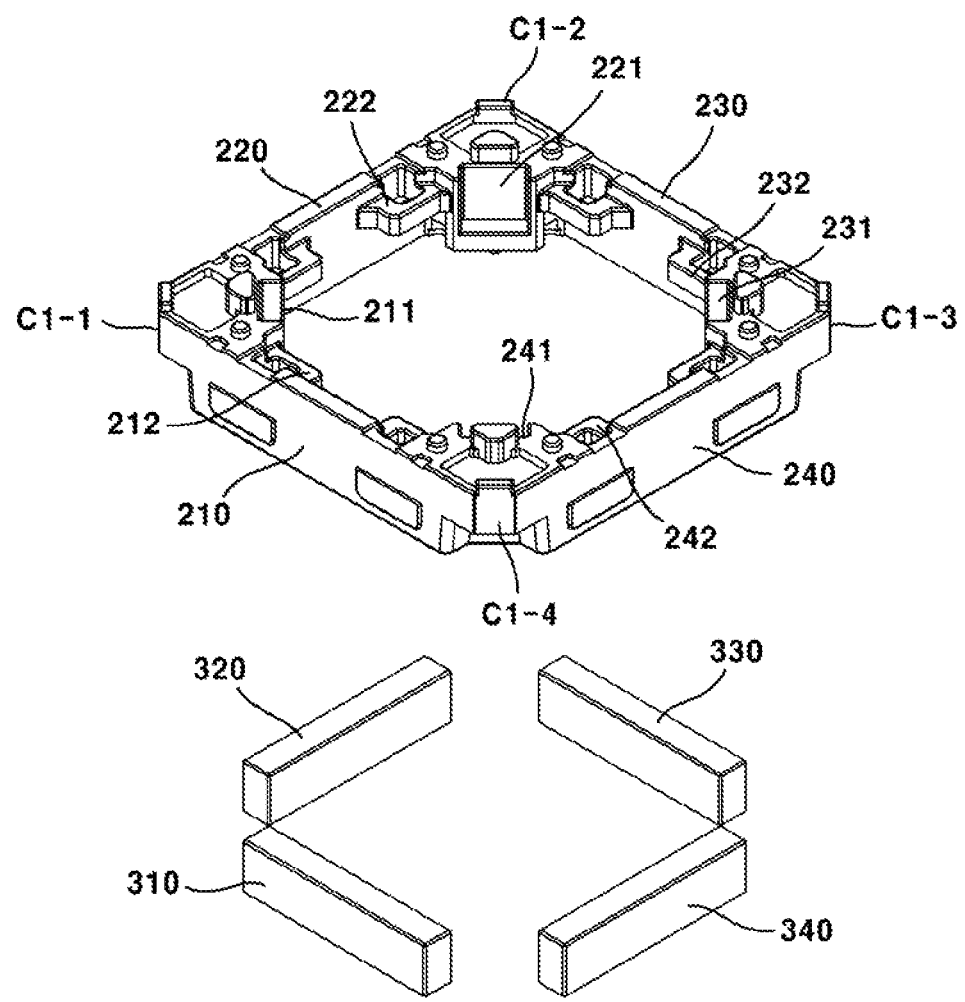
FIG. 8 is an exploded perspective view showing a housing and a driving magnet according to the first, second, third, fourth, and fifth embodiments.
Figure 9:
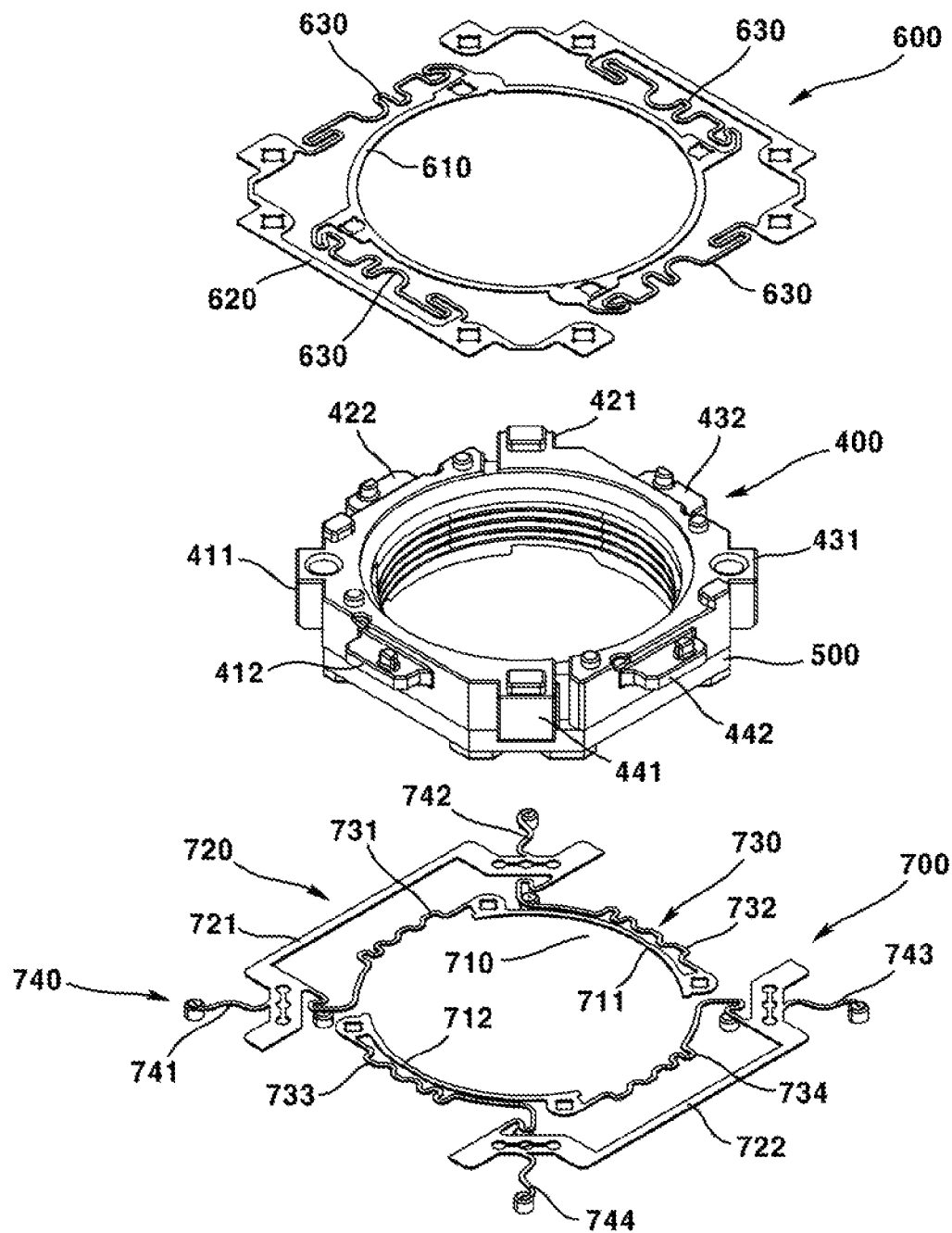
FIG. 9 is an exploded perspective view showing an upper elastic member, a bobbin, a first coil, and a lower elastic member applied to the first, second, and third embodiments.
Figure 10:
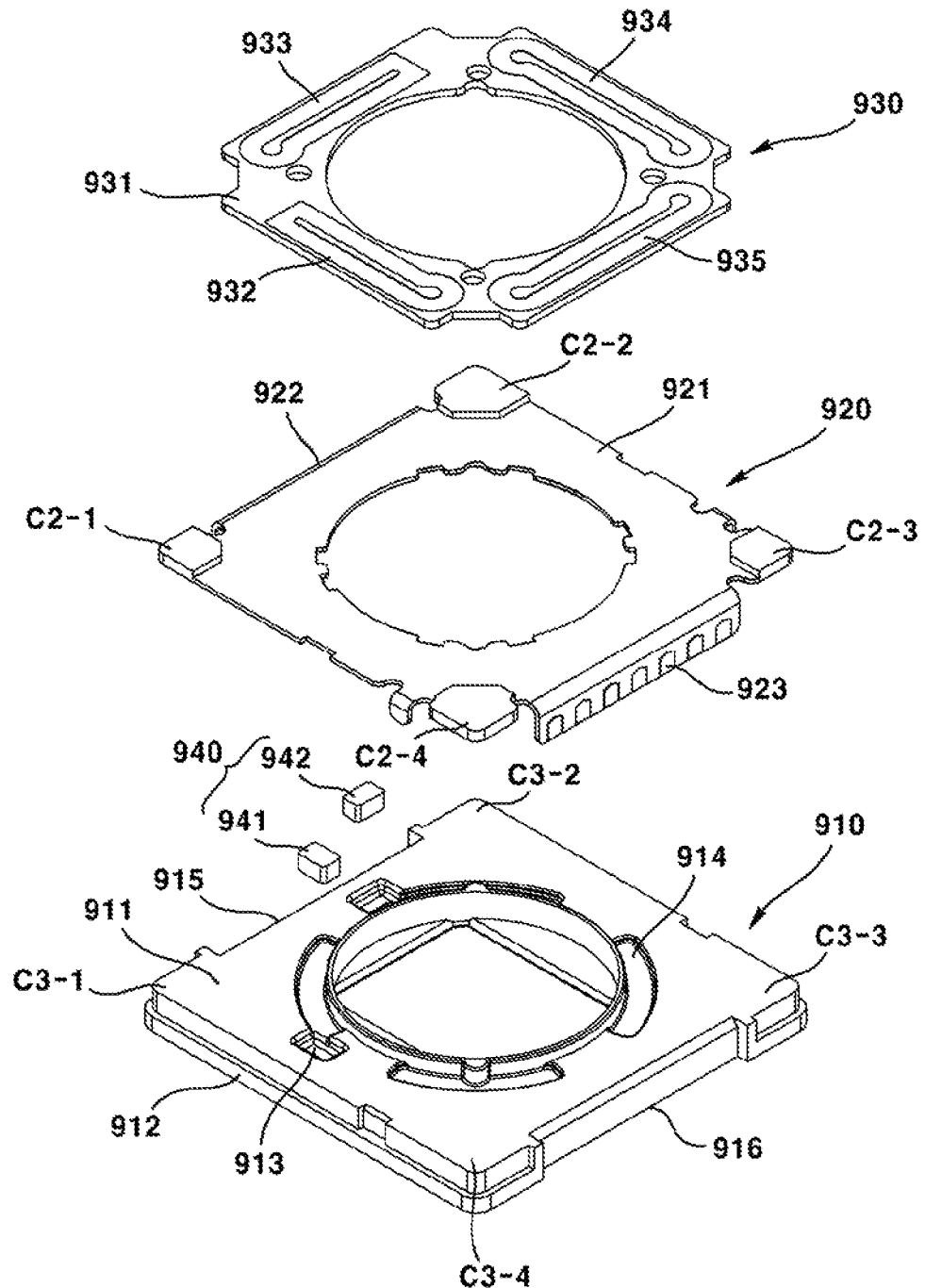
FIG. 10 is an exploded perspective view showing a base unit applied to the first, second, third, fourth, and fifth embodiments.
Figure 11:
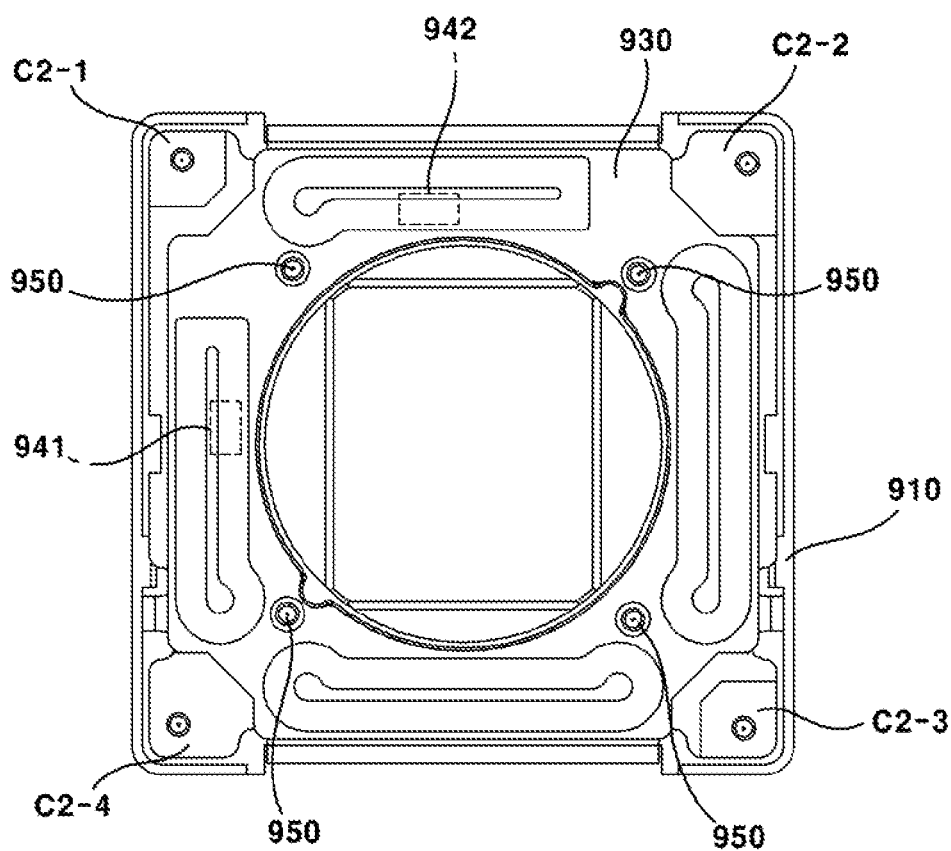
FIG. 11 is a plan view showing a base unit to be applied to the first, second, third, fourth and fifth embodiments.
Figure 12:
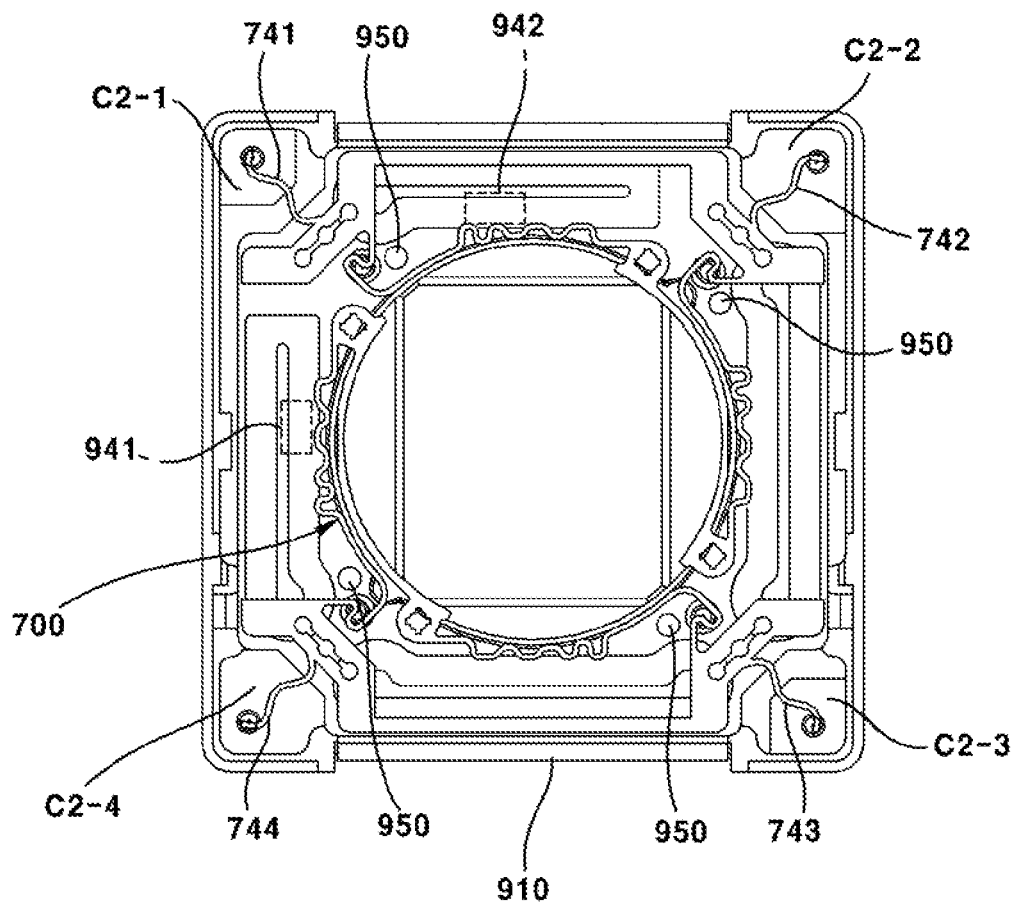
FIG. 12 is a plan view showing a lower elastic member and a base unit applied to the first embodiment.

First, the lens driving device 1000 of the first embodiment will be described with reference to the drawings. FIG. 4 is an exploded perspective view showing the lens driving device of the first embodiment; FIG. 7 is a perspective view showing a cover applied to the first embodiment; FIG. 8 is an exploded perspective view showing a housing and a driving magnet according to the first embodiment; FIG. 9 is an exploded perspective view showing an upper elastic member, a bobbin, a first coil, and a lower elastic member applied to the first embodiment; FIG. 10 is an exploded perspective view showing a base unit applied to the first embodiment; FIG. 11 is a plan view showing a base unit to be applied to the first embodiment; and FIG. 12 is a plan view showing a lower elastic member and a base unit applied to the first embodiment.

The lens driving device 1000 of the first embodiment may comprise a cover 100, a housing 200, a magnet 300, a bobbin 400, a first coil 500, an upper elastic member 600, and a lower elastic member 700, and a base unit 900.

Hereinafter, the cover 100 will be described with reference to FIG. 7. The cover 100 may be an exterior member of the lens driving device 1000. The cover 100 may comprise an upper plate 110 in the shape of a rectangular plate and a plurality of side plates 120, 130, 140, and 150 extending downward from each side of the upper plate 110. The upper plate 110 may be formed with a hole centered on an optical axis. The cover 100 may be in the shape of a cube block in which a lower surface is opened and disposed with a hole aligned with the optical axis on an upper surface thereof.

The housing 200, the magnet 300, the bobbin 400, the first coil 500, the upper elastic member 600, and the lower elastic member 700 may be accommodated in the cover 100. The base unit 900 may be disposed under the cover 100. The cover 100 may be supported by the base unit 900. The cover 100 may be coupled to the base unit 900 by an adhesive.

The material of the cover 100 may comprise a metal. In this case, the cover 100 may block external electromagnetic wave from penetrating into the inside or may prevent the electromagnetic wave from being discharged to the outside. That is, the cover 100 may shield the electromagnetic wave. Therefore, the cover 100 may be referred to as a "shield can". However, the material of the cover 100 is not limited thereto. For example, the material of the cover 100 may comprise plastic. In this case, the cover 100 may be manufactured by plastic injection.

The plurality of side plates 120, 130, 140, and 150 of the cover 100 may comprise a first side plate 120, a second side plate 130, a third side plate 140, and a fourth side plate 150. The first side plate 120 and the third side plate 140 may be disposed to face each other (the third side plate is disposed opposite the first side plate, and vice versa). The second side plate 130 and the fourth side plate 150 may be disposed to face each other (the fourth side plate is disposed opposite the second side plate, and vice versa). The first side plate 120 and the third side plate 140 may be connected by the second side plate 130 and the fourth side plate 150, and vice versa. The first side plate 120 and the third side plate 140 may be disposed in parallel to each other. The second side plate 130 and the fourth side plate 150 may be disposed in parallel to each other.

Lower ends of the first side plate 120, the second side plate 130, the third side plate 140, and the fourth side plate 150 may be coupled to a stepped portion 912 of the base 910. In this case, an adhesive may be used.

The first side plate 120 may comprise a first groove 121 formed to be concave up from the bottom. A plurality of first grooves 121 of the first side plate 120 may be provided, and the plurality of first grooves 121 of the first side plate 120 may be spaced apart from each other along the width direction of the first side plate 120. An adhesive may be applied to the first groove 121 of the first side plate 120.

The second side plate 130 may comprise a second groove 131 formed to be concave up from the bottom. The first terminal portion 922 of the first substrate 920 may be disposed in the second groove 131 of the second side plate 130. That is, the first terminal portion 922 of the first substrate 920 may be exposed to the outside through the second groove 131 of the second side plate 130.

The third side plate 140 may comprise a third groove 141 formed to be concave up from the bottom. A plurality of third grooves 141 of the third side plate 140 may be provided, and the plurality of third grooves 141 of the third side plate 140 may be spaced apart from each other along the width direction of the third side plate 140. An adhesive may be applied to the third groove 141 of the third side plate 140.

The fourth side plate 150 may comprise a fourth groove 151 formed to be concave up from the bottom. A second terminal portion 923 of the first substrate 920 may be disposed in the fourth groove 151 of the fourth side plate 150. That is, the second terminal portion 923 of the first substrate 920 may be exposed to the outside through the fourth groove 151 of the fourth side plate 150.

Hereinafter, the housing 200 will be described with reference to FIG. 8. The housing 200 may have a hollow shape in which holes are formed in the optical axis direction. The bobbin 400 and the first coil 500 may be accommodated in the housing 200. An upper elastic member 600 may be disposed above the housing 200. A lower elastic member 700 may be disposed below the housing 200. The housing 200 may be spaced apart upward from the base unit 900 by the lower elastic member 700. The magnet 300 may be located in the housing 200. In this case, the magnet 300 may be located to face the first coil 500 and the second coil 930, respectively.

The housing 200 and the bobbin 400 may be connected by the upper elastic member 600 and the lower elastic member 700. In this case, the housing 200 and the bobbin 400 may be resiliently connected by the upper elastic member 600 and the lower elastic member 700. The bobbin 400 may move in the optical axis direction (vertical and up and down directions) by the resilient action of the upper elastic member 600 and the lower elastic member 700.

The housing 200 and the base unit 900 may be connected by the lower elastic member 700. In this case, the housing 200 and the base unit 900 may be resiliently connected by the lower elastic member 700. The housing 200 may be resiliently supported by the lower elastic member 700. The housing 200 may move or tilt in a direction perpendicular to the optical axis by the resilient action of the lower elastic member 700.

The housing 200 may receive a driving force by electromagnetic interaction between the magnet 300 and the second coil 930. The housing 200 may move or tilt in a direction perpendicular to the optical axis by the driving force. In this case, the bobbin 400 and the lens module 1 may move integrally with the housing 200 to perform the optical image stabilization (OIS) function.

The housing 200 may comprise a first side portion 210, a second side portion 220, a third side portion 230, a fourth side portion 240, a first corner C1-1, a second corner C1-2, a third corner C1-3, and the fourth corner C1-4.

The first side portion 210 and the third side portion 230 may face each other with the magnet 300, the bobbin 400, and the first coil 500 interposed therebetween (the third side portion is disposed opposite the first side portion, and vice versa). The second side portion 220 and the fourth side portion 240 may face each other with the magnet 300, the bobbin 400, and the first coil 500 interposed therebetween (the fourth side portion is disposed opposite the second side portion, and vice versa). The first side portion 210 and the third side portion 230 may be connected by the second side plate 220 and the fourth side portion 240, and vice versa. The first side portion 210 and the third side portion 230 may be disposed in parallel to each other. The second side portion 220 and the fourth side portion 240 may be disposed in parallel to each other.

The first corner C1-1 of the housing 200 may be located between the first side portion 210 and the second side portion 220. The second corner C1-2 of the housing 200 may be located between the second side portion 220 and the third side portion 230. The third corner C1-3 of the housing 200 may be located between the third side portion 230 and the fourth side portion 240. The fourth corner C1-4 of the housing 200 may be located between the fourth side portion 240 and the first side portion 210.

The first corner C1-1 of the housing 200 can be located to correspond (closest) to the first corner C2-1 of the first substrate 920 and the first corner C3-1 of the base 910 among a plurality of corners of the first substrate 920 and the base 910. The second corner C1-2 of the housing 200 may be located to correspond (closest) to the second corner C2-2 of the first substrate 920 and the second corner C3-2 of the base 910 among the plurality of corners of the first substrate 920 and the base 910. The third corner C1-3 of the housing 200 can be located to correspond (closest) to the third corner C2-3 of the first substrate 920 and the third corner C3-3 of the base 910 among the plurality of corners of the first substrate 920 and the base 910. The fourth corner C1-4 of the housing 200 may be located to correspond (closest) to the fourth corner C2-4 of the first substrate 920 and the fourth corner C3-4 of the base 910 among the plurality of corners of the first substrate 920 and the base 910.

The first corner C1-1 of the housing 200 may comprise a first accommodating portion which is concavely formed from the inner side surface toward the outer side. The second corner C1-2 of the housing 200 may comprise a second accommodating portion 221 which is concavely formed from the inner side surface toward the outer side. The third corner C1-3 of the housing 200 may comprise a third accommodating portion 231 which is concavely formed from the inner side surface toward the outer side. The fourth corner C1-4 of the housing 200 may comprise a fourth accommodating portion 241 which is concavely formed from the inner side surface toward the outer side.

An outer end (at least a portion) of a first stopper 411 of the bobbin 400 may be disposed in the first accommodating portion 211. An outer end (at least a portion) of a second stopper 421 of the bobbin 400 may be disposed in the second accommodation portion 221. An outer end (at least a portion) of a third stopper 431 of the bobbin 400 may be disposed in the third accommodating portion 231. An outer end (at least a portion) of a fourth stopper 441 of the bobbin 400 may be disposed in the fourth accommodation portion 241.

When the bobbin 400 rotates due to an unexpected external force, the first to fourth stoppers 411, 421, 431, and 441 are in contact with the housing 200 at the first to fourth accommodating portions 211, 221, 231, and 241 so that the rotation of the bobbin 400 can be blocked.

A first magnet 310 may be disposed inside the first side portion 210. A second magnet 320 may be disposed inside the second side portion 220. A third magnet 330 may be disposed inside the third side portion 230. A fourth magnet 340 may be disposed inside the fourth side portion 240.

The first side portion 210 may comprise a first stop block 212 protruding inward from the inner side surface. The first stop block 212 may be located above the first magnet 310. The first stop block 212 may be formed of a pair of members spaced apart from each other in the width direction of the first side portion 210. A fifth stopper 412 of the bobbin 400 may be spaced upwardly on the first stop block 212.

The second side portion 220 may comprise a second stop block 222 that protrudes inward from the inner side surface. The second stop block 222 may be located above the second magnet 320. The second stop block 222 may be formed of a pair of members spaced apart from each other in the width direction of the second side portion 220. A sixth stopper 422 of the bobbin 400 may be spaced upwardly on the second stop block 222.

The third side portion 230 may comprise a third stop block 232 protruding from the inner side surface to the inner side. The third stop block 232 may be located above the third magnet 330. The third stop block 232 may be formed as a pair of members spaced apart from each other in the width direction of the third side portion 210. A seventh stopper 432 of the bobbin 400 may be spaced upwardly on the third stop block 232.

The fourth side portion 240 may comprise a fourth stop block 242 protruding from the inner side surface to the inner side. The fourth stop block 242 may be located above the fourth magnet 340. The fourth stop block 242 may be formed as a pair of members spaced apart from each other in the width direction of the fourth side portion 240. An eighth stopper 442 of the bobbin 400 may be spaced upwardly on the fourth stop block 242.

When the bobbin 400 moves downward, the fifth to eighth stoppers 412, 422, 432, and 442 are to be in contact with the first to fourth stop blocks 212, 222, 232, and 242 so that the downward movement of the bobbin 400 can be blocked.

In the upper and lower surfaces of the housing 200, a plurality of bosses, which is respectively to be inserted (disposed) into a plurality of holes of the upper elastic member 600 and the lower elastic member 700, may be protruded.

Hereinafter, the magnet 300 will be described with reference to FIG. 8. The magnet 300 may be disposed in the housing 200. The magnet 300 may be disposed to face the first coil 500. The magnet 300 may electromagnetically interact with the first coil 500 to provide driving force to the bobbin 400 (auto focus function). The magnet 300 may be disposed to face the second coil 930. The magnet 300 may electromagnetically interact with the second coil 930 to provide a driving force to the housing 200 (optical image stabilization function).

The magnet 300 may comprise a first magnet 310, a second magnet 320, a third magnet 330, and a fourth magnet 340. The first magnet 310, the second magnet 320, the third magnet 330, and the fourth magnet 340 may be in the form of a flat plate. The first magnet 310 may be coupled to the inner side surface of the first side portion 210 by an adhesive. The second magnet 320 may be coupled to the inner side surface of the second side portion 220 by an adhesive. The third magnet 330 may be coupled to the inner side surface of the third side portion 230 by an adhesive. The fourth magnet 340 may be coupled to the inner side surface of the fourth side portion 240 by an adhesive.

The first magnet 310, the second magnet 320, the third magnet 330, and the fourth magnet 340 may face the first coil 500. The first magnet 310 may face a 2-1 coil 932 of the second coil 930. The second magnet 320 may face a 2-2 coil 933 of the second coil 930. The third magnet 330 may face a 2-3 coil 934 of the second coil 930. The fourth magnet 340 may face a 2-4 coil 935 of the second coil 930.

Hereinafter, the bobbin 400 will be described with reference to FIG. 9. The bobbin 400 may have a hollow shape in which holes are formed in the optical axis direction. The bobbin 400 may be mounted with a lens module 1. In this case, the lens module 1 may be disposed in the bobbin 400. The bobbin 400 may be mounted with a first coil 500. In this case, the first coil 500 may be disposed on the outer side surface (outer circumferential surface) of the bobbin 400.

The bobbin 400 may be disposed in the housing 200. An upper elastic member 600 may be disposed at the upper side of the bobbin 400. A lower elastic member 700 may be disposed at the lower side of the bobbin 400.

The bobbin 400 and the housing 200 may be connected by the upper elastic member 600 and the lower elastic member 700. In this case, the bobbin 400 and the housing 200 may be resiliently connected by the upper elastic member 600 and the lower elastic member 700. The bobbin 400 may move in the optical axis direction by the resilient action of the upper elastic member 600 and the lower elastic member 700.

The bobbin 400 may receive a driving force by electromagnetic interaction between the first coil 500 and the magnet 300. The bobbin 400 may move in the optical axis direction by the driving force. The bobbin 400 may move (both directions) to both the one side and the other side (upper side and the other side) in the optical axis direction by the driving force. In this case, the lens module 1 may be integrally moved with the bobbin 400 in the optical axis direction to perform an auto focus function (AF function).

A plurality of bosses respectively inserted into the plurality of holes of the upper elastic member 600 and the lower elastic member 700 may be protruded from the upper and lower surfaces of the bobbin 400.

The bobbin 400 may comprise first to eighth stoppers 411, 421, 431, 441, 412, 422, 432, and 442. The first to eighth stoppers 411, 421, 431, 441, 412, 422, 432, and 442 may be protruded outward from the outer circumferential surface of the bobbin 400. The first to eighth stoppers 411, 421, 431, 441, 412, 422, 432, and 442 may be disposed on the first coil 500. The first to eighth stoppers 411, 421, 431, 441, 412, 422, 432, and 442 may be spaced apart from the first coil 500 upwardly. The first to fourth stoppers 411, 421, 431, and 441 may block the rotational movement of the bobbin 400. The fifth to eighth stoppers 412, 422, 432, and 442 may block the downward movement of the bobbin 400. Furthermore, a protrusion protruding upward from the upper surface of the bobbin 400 may be formed, and the upper plate 110 of the cover 100 may be contacted to block the upward movement of the bobbin 400.

Hereinafter, the first coil 500 will be described with reference to FIG. 9. The first coil 500 may be a coil block wound on an outer circumferential surface of the bobbin 400. The first coil 500 may be disposed to face the magnet 300. The first coil 500 may be electrically connected to the lower elastic member 700. To this end, one end and the other end of the first coil 500 may be soldered (solder-bonded) to a 1-1 coupling portion 711 and a 1-2 coupling portion 712 of the lower elastic member 700, respectively. The first coil 500 may receive current (power) from the first substrate 920 through the lower elastic member 700. That is, the first substrate 920 may apply power (current) to the first coil 500. In this case, the wavelength, intensity, direction, and the like of the current supplied to the first coil 500 may be controlled by the control unit of the camera module 10.

Hereinafter, the upper elastic member 600 will be described with reference to FIG. 9. The upper elastic member 600 which is to supplement the resilient force of the lower elastic member 700 may be omitted. The upper elastic member 600 may be in the form of a plate spring. The upper elastic member 600 may be disposed on the housing 200 and the bobbin 400. The upper elastic member 600 may be coupled to the upper surface of the housing 200 and the upper surface of the bobbin 400, respectively. The upper elastic member 600 may resiliently connect the housing 200 and the bobbin 400. The upper elastic member 600 may resiliently support the bobbin 400.

The upper elastic member 600 may comprise an inner resilient portion 610, an outer resilient portion 620, and a connecting resilient portion 630. The inner resilient portion 610 may be disposed on the bobbin 400. The inner resilient portion 610 may be coupled to the upper surface of the bobbin 400. The outer resilient portion 620 may be disposed on the housing 200. The outer resilient portion 620 may be coupled to the upper surface of the housing 200. The connecting resilient portion 630 may be disposed between the inner resilient portion 610 and the outer resilient portion 620. The connecting resilient portion 630 may be four. The four connecting resilient portions 630 may be spaced apart from each other. Curvatures may be formed in the connecting resilient portion 630 in various directions.

Hereinafter, the lower elastic member 700 will be described with reference to FIG. 9. The lower elastic member 700 may be in the form of a plate spring. The lower elastic member 700 may be disposed at the lower side of the housing 200 and the bobbin 400. The lower elastic member 700 may be coupled to the lower surface of the housing 200 and the lower surface of the bobbin 400, respectively. Furthermore, the lower elastic member 700 may be coupled with the base unit 900. That is, the lower elastic member 700 resiliently connects the housing 200 and the bobbin 400 to resiliently support the bobbin 400, and at the same time, resiliently connects the housing 200 and the base unit 900 so as to resiliently support the housing 200. The housing 200 may be located spaced apart upwardly (suspended) from the base unit 900 by the lower elastic member 700. The lower elastic member 200 may be coupled to the first substrate 920 of the base unit 900 or may be coupled to the base 910 of the base unit 900.

The lower elastic member 700 may be electrically connected to the first coil 500. The lower elastic member 700 may be electrically connected to a 1-1 substrate 920. When the lower elastic member 700 is coupled to the 1-1 substrate 920, the lower elastic member 700 may be directly contacted with the 1-1 substrate 920 to be electrically connected. When the lower elastic member 700 is coupled to the base 910, it may be electrically connected to the 1-1 substrate 920 by a separate conductive member. The first coil 500 may receive a current (power) from the 1-1 substrate 920 through the lower elastic member 700.

The lower elastic member 700 may comprise a first coupling portion 710, a second coupling portion 720, a first connecting portion 730, and a second connecting portion 740. The lower elastic member 700 may be separated into a first lower elastic member and a second lower elastic member spaced apart from each other. That is, the lower elastic member 700 may be formed of a pair of members spaced apart from each other. When power is applied to the first coil 500, one of the first lower elastic member and the second lower elastic member may form a positive (+) conductive line, and the other may form a negative (−) conductive line. Since the positive (+) and negative (−) conductive lines are spaced apart from each other, no electrical short occurs.

The first coupling portion 710 may be located inside the second coupling portion 720. The first coupling portion 710 may be located below the bobbin 400. The first coupling portion 710 may be coupled to the bottom surface of the bobbin 400. The first coupling portion 710 may be electrically connected to the first coil 500. A plurality of holes may be formed in the first coupling portion 710 in which a plurality of bosses protruding from the bottom surface of the bobbin 400 are inserted (disposed).

The first coupling portion 710 may comprise a 1-1 coupling portion 711 and a 1-2 coupling portion 712 spaced apart from each other. In this case, the 1-1 coupling portion 710 may be located on the first lower elastic member, and the 1-2 coupling portion 712 may be located on the second lower elastic member. One end portion of the one side of the first coil 500 may be soldered to the 1-1 coupling portion 711 to be electrically connected thereto. The other end of the first coil 500 may be soldered to the 1-2 coupling portion 712 to be electrically connected thereto. Therefore, the first coupling portion 711 may be electrically connected to the first coil 500.

The second coupling portion 720 may be located outer side of the first coupling portion 710. The second coupling portion 720 may be located below the housing 400. The second coupling portion 720 may be coupled to the bottom surface of the housing 400. A plurality of holes may be formed in the second coupling portion 720 in which a plurality of bosses protruding from the bottom surface of the housing 400 are inserted (disposed).

The second coupling portion 720 may comprise a 2-1 coupling portion 721 and a 2-2 coupling portion 722 spaced apart from each other. In this case, the 2-1 coupling portion 721 may be located on the first lower elastic member, and the 2-2 coupling portion 722 may be located on the second lower elastic member.

The first connecting portion 730 may be located between the first coupling portion 710 and the second coupling portion 720. The first connecting portion 730 may resiliently connect the first coupling portion 710 and the second coupling portion 720. That is, the first connecting portion 730 may resiliently connect the housing 200 and the bobbin 400. The first connecting portion 730 may be extended from the corners C1-1, C1-2, C1-3, and C1-4 of the housing 200 to the first coupling portion 710. In this case, the first connecting portion 730 may be curved in various directions. This is to increase the resilient force.

The first connecting portion 730 may comprise a 1-1 connecting portion 731, a 1-2 connecting portion 732, a 1-3 connecting portion 733, and a 1-4 connecting portion 734 spaced apart from each other. The 1-1 connecting portion 731 and the second-second connecting portion 732 may be located on the first lower elastic member, and the 1-3 connecting portion 733 and the 1-4 connecting portion 734 may be located on the second lower elastic member.

The 1-1 connecting portion 731 may be extended from the first corner C1-1 of the housing 200 to the 1-1 coupling portion 711. The 1-2 connecting portion 732 may be extended from the second corner C1-2 of the housing 200 to the first-first coupling portion 711. The first connecting portion 733 may be extended from the third corner C1-3 of the housing 200 to the 1-2 coupling portion 712. The first to fourth connecting portions 734 may be extended from the fourth corner C1-4 of the housing 200 to the 1-2 coupling portion 712.

The second connecting portion 740 may be located outer side of the second coupling portion 720. The second connecting portion 740 may resiliently connect the housing 200 and the base unit 900. As a result, the lower elastic member 700 may resiliently support the housing 200.

In more detail, the second connecting portion 740 may resiliently connect the second coupling portion 720 and the first substrate 920. As a result, the lower elastic member 700 may be coupled to the first substrate 920. At the same time, the second connecting portion 740 may electrically connect the lower elastic member 700 and the first substrate 920.

In contrast, the second connecting portion 740 may resiliently connect the second coupling portion 720 and the base 910. As a result, the lower elastic member 700 may be coupled to the base 910. In this case, the lower elastic member 700 and the first substrate 920 may be electrically connected by a separate conductive member.

The height of the portion (end portion of one side) of the second connecting portion 740 located in the housing 200 may be greater than the height of the portion (end portion of the other side) of the second connecting portion 740 located in the first substrate 920 or the base 910. That is, the second connecting portion 740 may be inclined upward from the first substrate 920 or the base 910 toward the housing 200. This is to provide a biasing force to the housing 200. In addition, the housing 200 may be located spaced apart upward (suspended) from the base unit 900 by such a structure.

The second connecting portion 740 may comprise a second-first connecting portion 741, a second-second connecting portion 742, a second-third connecting portion 743, and a second-fourth connecting portion 744 spaced apart from each other. The second-first connecting portion 741 and the second-second connecting portion 742 may be located in the first lower elastic member. The second-third connecting portion 743 and the second-fourth connecting portion 744 may be located in the second lower elastic member.

The second-first connecting portion 741 may be extended from the first corner C1-1 of the housing 200 to the first corner C2-1 of the first substrate 920. The second-first connecting portion 741 may be coupled to the first corner C2-1 of the first substrate 920. The second-second connecting portion 742 may be extended from the second corner C1-2 of the housing 200 to the second corner C2-2 of the first substrate 920. The second-second connecting portion 742 may be coupled to the second corner C2-2 of the first substrate 920. The second-third connecting portion 743 may be extended from the third corner C1-3 of the housing 200 to the third corner C2-3 of the first substrate 920. The second-third connecting portion 743 may be coupled to the third corner C2-3 of the first substrate 920. The second-fourth connecting portion 744 may be extended from the fourth corner C1-4 of the housing 200 to the fourth corner C2-4 of the first substrate 920. The second-fourth connecting portion 744 may be coupled to the fourth corner C2-4 of the substrate 920. In this case, at least one of the second-first connecting portion 741 and the second-second connecting portion 742 may be electrically connected to the first substrate 920, and at least one of the second-third connecting portion 743 and the second-fourth connecting portion 744 may be electrically connected to the first substrate 920. By the first coil 500, the lower elastic member 700, and the first substrate 920, a circuit for applying a current (power) to the first coil 500 may be formed.

However, as described above, the second connecting portion 740 may be extended to the base 910 instead of the first substrate 920. In this case, the second-first connecting portion 741 may be extended from the first corner C1-1 of the housing 200 to the first corner C3-1 of the base 910. The second-first connecting portion 741 may be coupled to the first corner C3-1 of the base 910. The second-second connecting portion 742 may be extended from the second corner C1-2 of the housing 200 to the second corner C3-2 of the base 910. The second-second connecting portion 742 may be coupled to the second corner C3-2 of the base 910. The second-third connecting portion 743 may be extended from the third corner C1-3 of the housing 200 to the third corner C3-3 of the base 910. The second-third connecting portion 743 may be coupled to the third corner C3-3 of the base 910. The second-fourth connecting portion 744 may be extended from the fourth corner C1-4 of the housing 200 to the fourth corner C3-4 of the base 910. The second-fourth connecting portion 744 may be coupled to the fourth corner C3-4 of the base 910. The lower elastic member 700 may be connected to the second substrate 930.

Hereinafter, the base unit 900 will be described with reference to FIGS. 10, 11, and 12. The base unit 900 may be disposed below the cover 100, the housing 200, the magnet 300, the bobbin 400, the first coil 500, the upper elastic member 600, and the lower elastic member 700. The base unit 900 may support the cover 100. Lower ends of the four side plates 120, 130, 140, and 150 of the cover 100 may be fixed to the base unit 900.

The base unit 900 may close the lower opening of the cover 100. The housing 200, the magnet 300, the bobbin 400, the first coil 500, the upper elastic member 600 and the lower elastic member 700 can be accommodated in the space formed by the cover 100 and the base unit 900.

The base unit 900 may be formed with a hole in the center. Therefore, the light transmitted through the lens module 1 may be irradiated to the image sensor 3 through the hole of the base unit 900.

The base unit 900 may comprise a base 910, a 1-1 substrate 920, a second substrate 930, a housing sensor 940, and a bearing 950.

The base 910 may be approximately in the shape of a square plate. The base 910 may be located below the first substrate 920. The sensor 940 may be disposed on the base 910. The base 910 may support the cover 100. The base 910 may be coupled to the cover 100 by an adhesive.

The base 910 may comprise a body 911, a stepped portion 912, a sensor accommodating portion 913, a foreign substance accommodating portion 914, a first terminal accommodating portion 915, a second terminal accommodating portion 916, a first corner C3-1, a second corner C3-2, a third corner C3-3, and a fourth corner C3-4.

The body 911 may be in the form of a square plate formed with a hole formed in the center in the optical axis direction (vertical, up and down direction). The infrared cut filter 4 of the camera module 10 may be disposed in the hole of the body 911.

The stepped portion 912 may be protruded outward from the bottom of the outer side surface of the body 911. The stepped portion 912 may be formed by being protruded outward from a portion of the edge of the body 911. Lower ends of the four side plates 120, 130, 140, and 150 of the cover 100 may be coupled to the stepped portion 912.

The sensor accommodating portion 913 may be in the shape of a groove recessed downward from an upper surface of the body 911. The sensor accommodating portion 913 may be connected to the foreign substance accommodating portion 914. The housing sensor 940 may be accommodated in the sensor accommodating portion 913.

The foreign substance accommodating portion 914 may be in the shape of a groove recessed downward from the upper surface of the body 911. The foreign substance accommodating portion 914 may be continuously or intermittently formed along the edge of the hole of the body 911.

The first terminal accommodating portion 915 and the second terminal accommodating portion 916 may be formed by being recessed inward from the outer side surface of the body 911. The first terminal accommodating portion 915 and the second terminal accommodating portion 916 may be located spaced apart from each other. In this case, the first terminal accommodating portion 915 may be located opposite to the second terminal accommodating portion 916 (or vice versa). A first terminal 922 may be disposed in the first terminal accommodating portion 915. In this case, the first terminal accommodating portion 915 may face the inner side surface of the first terminal 922. A second terminal 923 may be disposed in the second terminal accommodating portion 916. In this case, the second terminal accommodating portion 916 may face the inner side surface of the second terminal 923.

The first corner C3-1, the second corner C3-2, the third corner C3-3, and the fourth corner C3-4 of the base 910 may be located at four corners of the body 911, respectively. The first corner C3-1 of the base 910 may be located to correspond to the first corner C1-1 of the housing 200 among the plurality of corners of the housing 200 (most closely located). The first corner C3-1 of the base 910 may be located to correspond to the first corner C2-1 of the first substrate 920 of the plurality of corners of the first substrate 920 (most closely located). The second corner C3-2 of the base 910 may be located to correspond to the second corner C1-2 of the housing 200 among the plurality of corners of the housing 200 (most closely located). The second corner C3-2 of the base 910 may be located to correspond to the second corner C2-2 of the first substrate 920 among the plurality of corners of the first substrate 920 (most closely located). The third corner C3-1 of the base 910 may be located to correspond to the third corner C1-3 of the housing 200 among the plurality of corners of the housing 200 (most closely located). The third corner C3-3 of the base 910 may be located to correspond to the third corner C2-3 of the first substrate 920 among the corners of the first substrate 920 (most closely located). The fourth corner C3-4 of the base 910 may be located to correspond to the fourth corner C1-4 of the housing 200 among the plurality of corners of the housing 200 (most closely located). The fourth corner C3-4 of the base 910 may be located to correspond to the fourth corner C2-4 of the first substrate 920 of the plurality of corners of the first substrate 920 (most closely located).

The first substrate 920 may be a flexible printed circuit board (FPCB). The first substrate 920 may be disposed above the base 910. The first substrate 920 may be disposed below the second substrate 930. The first substrate 920 may be located between the base 910 and the second substrate 930.

The first substrate 920 may be electrically connected to the main substrate 2 of the camera module 10. The first substrate 920 may be electrically connected to the lower elastic member 700. The first substrate 920 may receive current (power) from the main substrate 2 and apply current (power) to the first coil 500 through the lower elastic member 700. The first substrate 920 may be electrically connected to the second substrate 930. The first substrate 920 may be electrically connected to the second coil 931. The first substrate 920 may receive a current (power) from the main substrate 2 to supply a current (power) to the second coil 931. In this case, the intensity, direction, and wavelength of the current supplied to the first coil 500 and the second coil 931 may be controlled by the control unit of the camera module 10.

The first substrate 920 may be resiliently connected to the housing 200 by the lower elastic member 700. The first substrate 920 may be coupled to the lower elastic member 700.

The first substrate 920 may comprise a central substrate 921, a first terminal 922, a second terminal 923, a first corner C2-1, a second corner C2-2, a third corner C2-3, and a fourth corner C2-4.

The central substrate 921 may be a printed circuit board (PCB). The central substrate 921 may be in the form of a plate having a hole formed in the center thereof. External light may be irradiated to the image sensor 3 through the hole of the central substrate 921.

The first terminal 922 and the second terminal 923 may be a flexible printed circuit board (FPCB). The first terminal 922 may be disposed opposite the second terminal 923 (or vice versa). The first terminal 922 may be extended downward from one edge of the central substrate 921. The first terminal 922 may be disposed in the first terminal accommodating portion 915 of the base 910. The first terminal 922 may be exposed to the outside through the second groove 131 of the cover 100. The first terminal 922 may be electrically connected to the main substrate 2. The second terminal 923 may be extended downward from the other edge of the central substrate 921. The second terminal 923 may be disposed in the second terminal accommodating portion 916 of the base 910. The second terminal 923 may be exposed to the outside through the fourth groove 151 of the cover 100. The second terminal 923 may be electrically connected to the main substrate 2.

The first corner C2-1, the second corner C2-2, the third corner C2-3, and the fourth corner C2-4 of the first substrate 920 may be located at the four corners of the central substrate 921, respectively. The first corner C2-1 of the first substrate 920 may be located to correspond to the first corner C1-1 of the housing 200 among the plurality of corners of the housing 200 (most closely located). The first corner C2-1 of the first substrate 920 may be located to correspond to the first corner C3-1 of the base 910 among the plurality of corners of the base 910 (most closely located). The second corner C2-2 of the first substrate 920 may be located to correspond to the second corner C1-2 of the housing 200 among the plurality of corners of the housing 200 (most closely located). The second corner C2-2 of the first substrate 920 may be located to correspond to the second corner C3-2 of the base 910 among the plurality of corners of the base 910 (most closely located). The third corner C2-1 of the first substrate 920 may be located to correspond to the third corner C1-3 of the housing 200 among the plurality of corners of the housing 200 (most closely located). The third corner C2-3 of the first substrate 920 may be located to correspond to the third corner C3-3 of the base 910 among the plurality of corners of the base 910 (most closely located). The fourth corner C2-4 of the first substrate 920 may be located to correspond to the fourth corner C1-4 of the housing 200 among the plurality of corners of the housing 200 (most closely located). The fourth corner C2-4 of the first substrate 920 may be located to correspond to the fourth corner C3-4 of the base 910 among the plurality of corners of the base 910 (most closely located).

A power supply terminal may be formed in at least one of the first corner C2-1 and the second corner C2-2 of the first substrate 920, and the third corner C2-3 of the first substrate 920 and a ground terminal may be formed in at least one of the third corner C2-3 and the fourth corner C2-4 of the first substrate 920. On the contrary, a ground terminal may be formed in at least one of the first corner C2-1 and the second corner C2-2 of the first substrate 920, and a power terminal may be formed in at least one of the third corner C2-3 and the fourth corner C2-4 of the first substrate 920.

The first lower elastic member is electrically connected to at least one of the first corner C2-1 and the second corner C2-2 of the first substrate 920, and the second lower elastic member is electrically connected to at least one of the third corner C2-3 and the fourth corner C2-4 of the first substrate 920 so that the first substrate 920 may apply power to the coil 500 through the lower elastic member 700.

The second substrate 930 may be disposed on the first substrate 920.

The second coil 931 may be disposed on the first substrate 920. The second coil 931 may be disposed below the lower elastic member 700. The second coil 931 may face a driving magnet 300. The second coil 931 may be electrically connected to the first substrate 920. When a power source (current) is applied to the second coil 931, electromagnetic interaction with the driving magnet 300 occurs so that a driving force may be applied to the housing 200. As a result, the housing 200 may be moved or tilted in a direction perpendicular to the optical axis so that an optical image stabilization function can be performed.

The second coil 931 may comprise a 2-1 coil 932, a 2-2 coil 933, a 2-3 coil 934, and a 2-4 coil 935. That is, the second coil 931 may be four pattern coils formed on the second substrate 930. The 2-1 coil 932 may face the first magnet 310. The 2-2 coil 933 may face the second magnet 320. The 2-3 coil 934 may face the third magnet 330. The 2-4 coil 935 may face the fourth magnet 340.

The housing sensor 940 may be disposed in the base 910. The housing sensor 940 may be disposed in the sensor accommodating portion 913 of the base 910. The housing sensor 940 may be electrically connected to the first substrate 920. The housing sensor 940 may be a Hall sensor. The housing sensor 940 may detect the change in the magnetic force of the driving magnet 300 and output position information of the housing 200. The control unit of the camera module 10 may control the direction, wavelength, intensity, and the like of the current applied to the second coil 930 according to the location of the housing 200 (feedback control). As a result, the camera 200 may be driven more precisely so that an optical image stabilization function can be performed. The housing sensor 940 may be two. In this case, the first housing sensor 941 and the second housing sensor 942 may be disposed spaced apart from each other.

The bearing 950 may be in the form of a ball. The bearing 950 may be disposed on the base 910, the first substrate 920, or the second substrate 930. When the bearing 950 is disposed on the base 910, the bearing 950 may be exposed to the outside through a hole formed in the first substrate 920 and the second substrate 930. When the bearing 950 is disposed on the first substrate 920, the bearing 950 may be exposed to the outside through a hole formed in the second substrate 930. That is, the upper portion of the bearing 950 may be exposed to the outside of the base unit 900. An upper portion of the bearing 950 may support the housing 200. The bearing 950 stably supports the housing 200 and may perform a function of guiding in a direction perpendicular to the optical axis direction. There may be a plurality of bearings 950 and four bearings 950 may exist in the first embodiment. Meanwhile, the bearing 950 may directly contact the bottom surface of the housing 200 through a space formed in the lower elastic member 700.

In the lens driving device 1000 according to the first embodiment, both the housing 200 and the bobbin 400 may be resiliently supported by the lower elastic member 700. In this case, the housing 200 may be resiliently supported to be movable or tiltable in a direction perpendicular to the optical axis by the second connecting portion 740, and the bobbin 400 may be resiliently supported to move in the optical axis direction. Therefore, it is possible to provide a support structure capable of performing an optical image stabilization function or an auto focus function with a single member.

Figure 5:
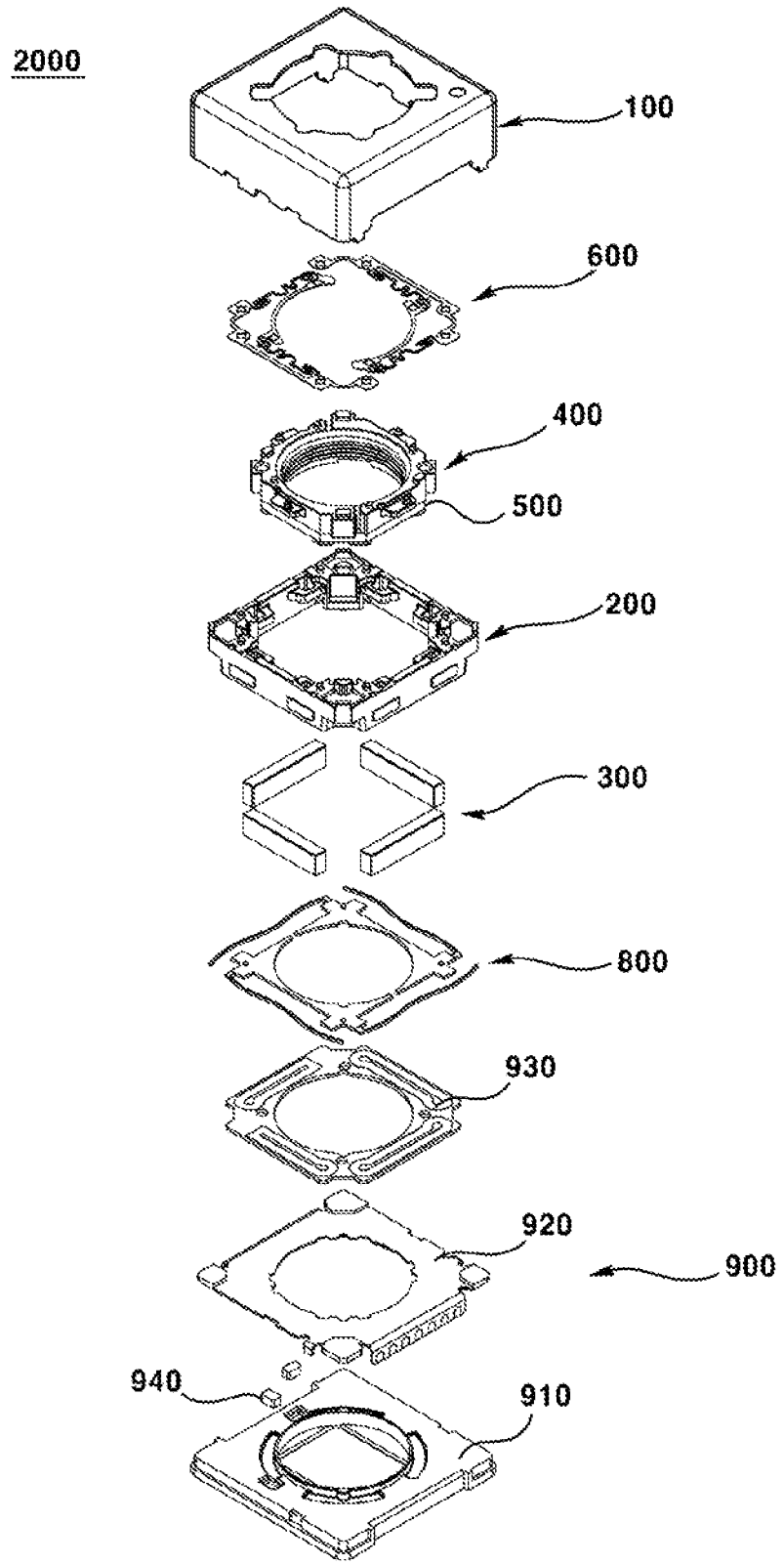
FIG. 5 is an exploded perspective view showing the lens driving device of the second embodiment.
Figure 13:
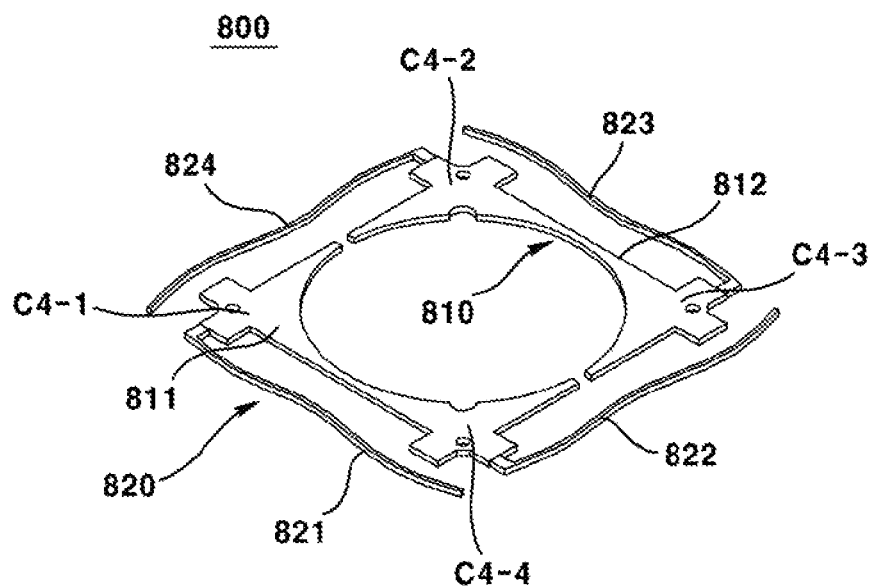
FIG. 13 is a perspective view showing a support elastic member applied to the second, third and fifth embodiments.
Figure 14:
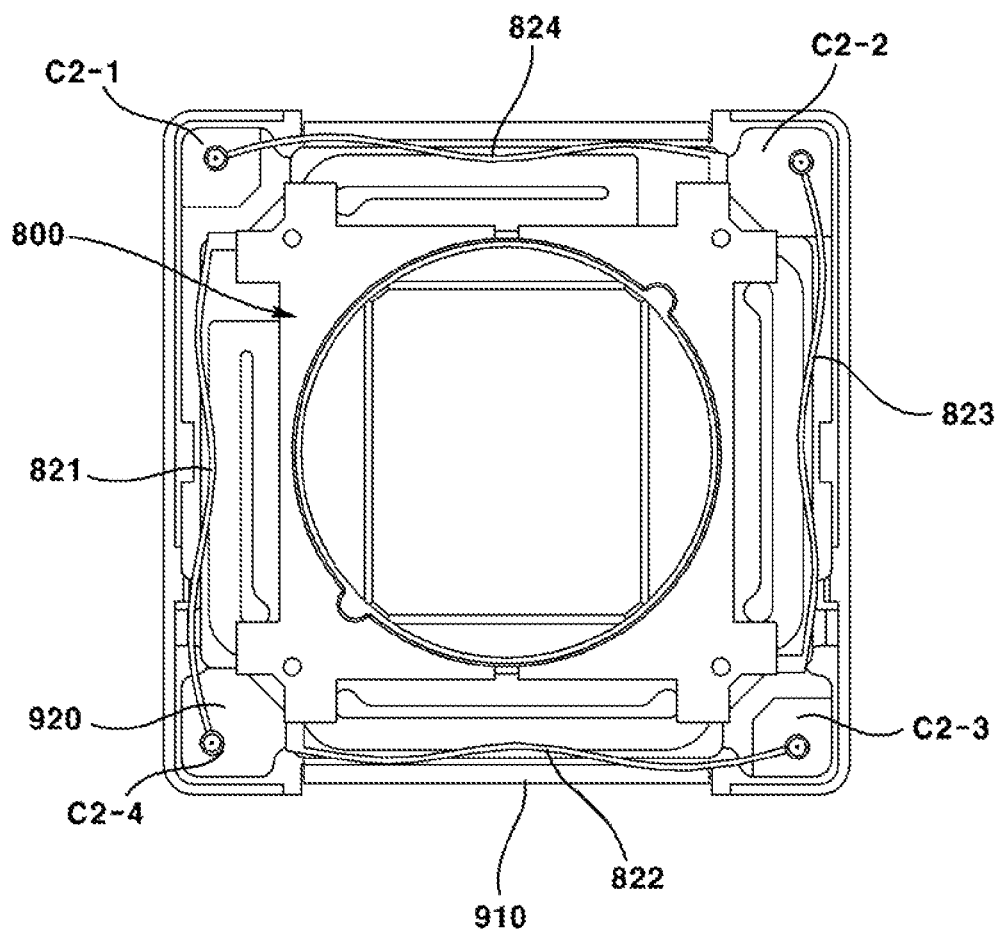
FIG. 14 is a plan view showing a support elastic member and a base unit applied to the second embodiment.

Hereinafter, a lens driving device 2000 of the second embodiment will be described with reference to the drawings. FIG. 5 is an exploded perspective view showing the lens driving device of the second embodiment; FIG. 13 is a perspective view showing a support elastic member applied to the second embodiment; and FIG. 14 is a plan view showing the support elastic member and a base unit applied to the second embodiment. In the lens driving device 2000 of the second embodiment, the lower elastic member 700 is omitted, and the support elastic member 800 is added. Other than this, technical features of the lens driving device 1000 of the first embodiment may be inferred and applied.

The support elastic member 800 may be disposed below the housing 200. The support elastic member 800 may be disposed on the base unit 900. The support elastic member 800 may resiliently support the housing 200. The housing 200 may be resiliently supported by the support elastic member 800 to move or tilt in a direction perpendicular to the optical axis. The support elastic member 800 may be electrically connected to the first coil 500. The support elastic member 800 may be electrically connected to the first substrate 920. The first substrate 920 may apply power (current) to the first coil 500 through the support elastic member 800. The support elastic member 800 may comprise a support portion 810, an extension portion 820, a first corner C4-1, a second corner C4-2, a third corner C4-3, and a fourth corner C4-4.

The support portion 810 may be disposed below the housing 200. The support portion 810 may be disposed above the second coil 930. The support portion 810 may be in the form of a plate with a hole in the center. External light may be irradiated to the image sensor 3 through the hole of the support portion 810. The support portion 810 may perform a function of stably supporting the housing 200. The support portion 810 may comprise a first support portion 811 and a second support portion 812 spaced apart from each other. The first support portion 811 and the second support portion 812 may be symmetrically disposed around the optical axis. The first support portion 811 may be electrically connected to one end of the first coil 500, and the second support portion 812 may be electrically connected to the other end of the first coil 500.

The first corner C4-1, the second corner C4-2, the third corner C4-3, and the fourth corner C4-4 of the support elastic member 800 may be located at each of the four corners of the support 810, respectively. The first corner C4-1 of the support elastic member 800 may be located to correspond to the first corner C1-1 of the housing 200 among the plurality of corners of the housing 200 (most closely located). The first corner C4-1 of the support elastic member 800 may be located to correspond to the first corner C2-1 of the first substrate 920 among the plurality of corners of the first substrate 920 most closely located). The first corner C4-1 of the support elastic member 800 may be located to correspond to the first corner C3-1 of the base 910 among the plurality of corners of the base 910 (most closely located). The second corner C4-2 of the support elastic member 800 may be located to correspond to the second corner C1-2 of the housing 200 among the plurality of corners of the housing 200 (most closely located). The second corner C4-2 of the support elastic member 800 may be located to correspond to the second corner C2-2 of the first substrate 920 among the corners of the first substrate 920 most closely located). The second corner C4-1 of the support elastic member 800 may be located to correspond to the first corner C3-2 of the base 910 among the plurality of corners of the base 910 (most closely located). The third corner C4-3 of the support elastic member 800 may be located to correspond to the third corner C1-3 of the housing 200 among the plurality of corners of the housing 200 (most closely located). The third corner C4-3 of the support elastic member 800 may be located to correspond to the third corner C2-3 of the first substrate 920 of the plurality of corners of the first substrate 920 (most closely located). The third corner C4-3 of the support elastic member 800 may be located to correspond to the third corner C3-3 of the base 910 of the plurality of corners of the base 910 (most closely located). The fourth corner C4-4 of the support elastic member 800 may be located to correspond to the fourth corner C1-4 of the housing 200 among the plurality of corners of the housing 200 (most closely located). The fourth corner C4-4 of the support elastic member 800 may be located to correspond to the fourth corner C2-4 of the first substrate 920 among the corners of the first substrate 920 (most closely located). The fourth corner C4-4 of the support elastic member 800 may be located to correspond to the fourth corner C3-4 of the base 910 among the plurality of corners of the base 910 (most closely located).

The first corner C4-1 of the support elastic member 800 and the fourth corner C4-4 of the support elastic member 800 may be located at the first support portion 811. The second corner C4-2 of the support elastic member 800 and the third corner C4-3 of the support elastic member 800 may be located at the second support portion 812.

The extension portion 820 may connect the support portion 810 and the first substrate 920.

The extension portion 820 may be electrically connected to the first substrate 920. However, the arrangement of the extension portion 820 is not limited thereto. The extension portion 820 may connect the support portion 810 and the base 910. In this case, the extension portion 820 may be electrically connected to the first substrate 920 by a separate conductive member. The extension portion 820 may comprise a first extension portion 821, a second extension portion 822, a third extension portion 823, and a fourth extension portion 824. The first extension portion 821 and the fourth extension portion 824 may be located on the first support portion 811. The second extension portion 822 and the third extension portion 823 may be located at the second support portion 812.

The first extension portion 821 may be extended from the first corner C4-1 of the support elastic member 800 to the fourth corner C2-4 of the first substrate 920. The first extension portion 821 may connect the first corner C4-1 of the first support portion 811 and the fourth corner C2-4 of the first substrate 920. The first extension portion 821 may be electrically connected to the fourth corner C2-4 of the first substrate 920. The first extension portion 821 may be inclined upward from the first substrate 920 toward the support elastic member 800. Accordingly, the first extension portion 821 may provide a biasing force to the first support portion 811. As a result, the first support portion 811 may support the housing 200 to suspend the housing 200 upward.

The second extension portion 822 may be extended from the second corner C4-2 of the support elastic member 800 to the first corner C2-1 of the first substrate 920. The second extension portion 822 may connect the second corner C4-2 of the second support portion 812 and the first corner C2-1 of the first substrate 920. The second extension portion 822 may be electrically connected to the first corner C2-1 of the first substrate 920. The second extension portion 822 may be inclined upward from the first substrate 920 toward the support elastic member 800. Accordingly, the second extension portion 822 may provide a biasing force to the second support portion 812. As a result, the second support portion 812 may support the housing 200 to suspend the housing 200 upward.

The third extension portion 823 may be extended from the third corner C4-3 of the support elastic member 800 to the second corner C2-2 of the first substrate 920. The third extension portion 823 may connect the third corner C4-3 of the second support portion 812 and the second corner C2-2 of the first substrate 920. The third extension portion 823 may be electrically connected to the second corner C2-2 of the first substrate 920. The third extension portion 823 may be inclined upward from the first substrate 920 toward the support elastic member 800. Accordingly, the third extension portion 823 may provide a biasing force to the second support portion 812. As a result, the second support portion 812 may support the housing 200 to suspend the housing 200 upward.

The fourth extension portion 824 may be extended from the fourth corner C4-4 of the support elastic member 800 to the third corner C2-3 of the first substrate 920. The fourth extension portion 824 may connect the fourth corner C4-4 of the first support portion 811 and the third corner C2-3 of the first substrate 920. The fourth extension portion 824 may be electrically connected to the third corner C2-3 of the first substrate 920. The fourth extension portion 824 may be inclined upward from the first substrate 920 toward the support elastic member 800. Accordingly, the fourth extension portion 824 may provide a biasing force to the first support portion 811. As a result, the first support portion 811 may support the housing 200 to suspend the housing 200 upward.

The extending direction of the first to fourth extension portions 821, 822, 823, and 824 is an advantageous structure for moving or tilting the housing 200 in a direction perpendicular to the optical axis. Furthermore, the first to fourth extension portions 821, 822, 823, and 824 may have a waveform structure that is curved a plurality of times in various directions perpendicular to the optical axis.

The support elastic member 800 may be connected to the second substrate 930. The support elastic member 800 may be referred to as a "plate spring" or a "plate elastic member".

In the lens driving device 2000 according to the second exemplary embodiment, the housing 200 may be resiliently supported by a support elastic member 800. In addition, the bobbin 400 may be resiliently supported by the upper elastic member 600. In this case, the support elastic member 800 has a structure specialized for moving or tilting the housing 200 in a direction perpendicular to the optical axis direction, and the upper elastic member 600 has a structure specialized for moving the bobbin 400 in the optical axis direction, and thereby it is possible to stably support both the housing 200 and the bobbin 400.

Figure 6:
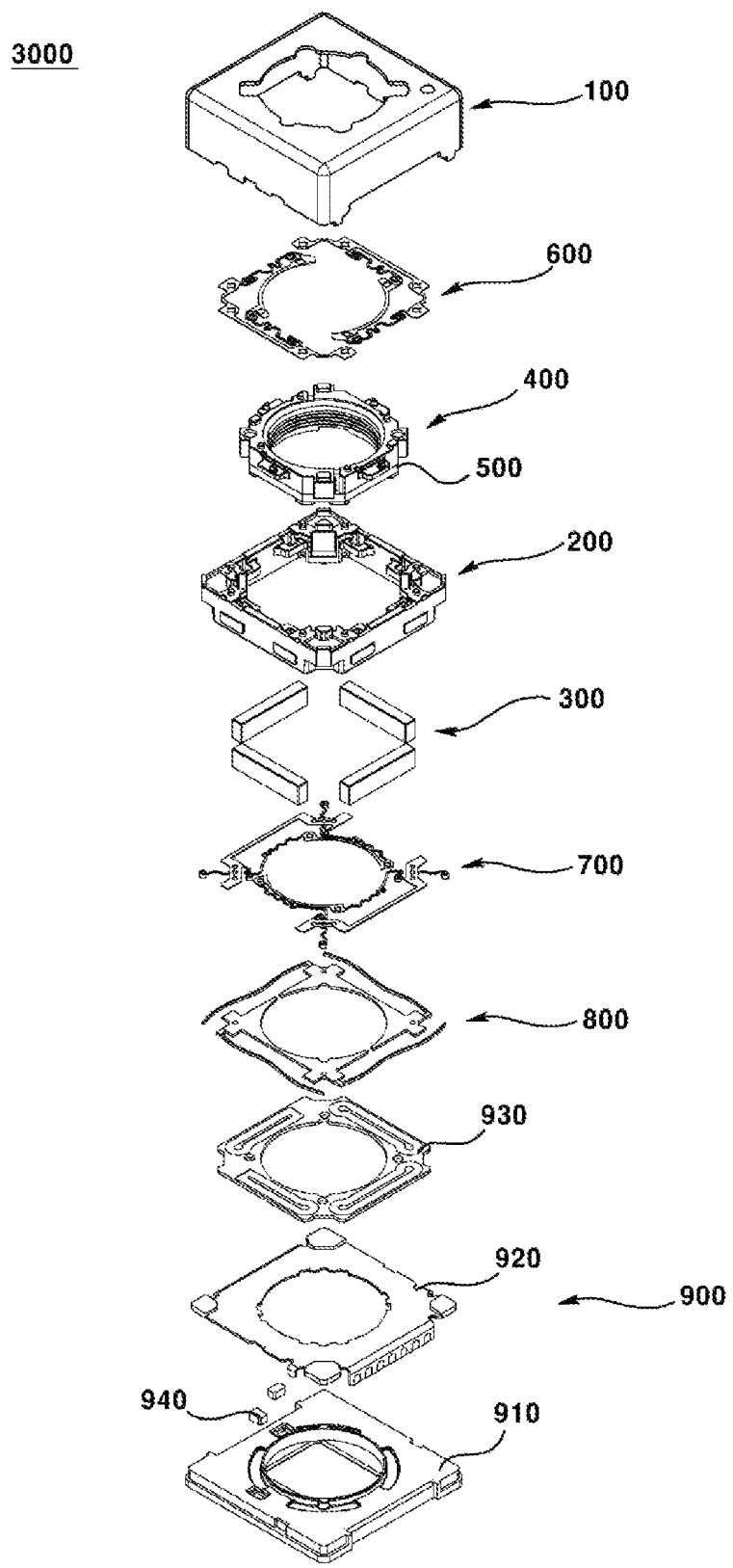
FIG. 6 is an exploded perspective view showing the lens driving device of the third embodiment.
Figure 15:
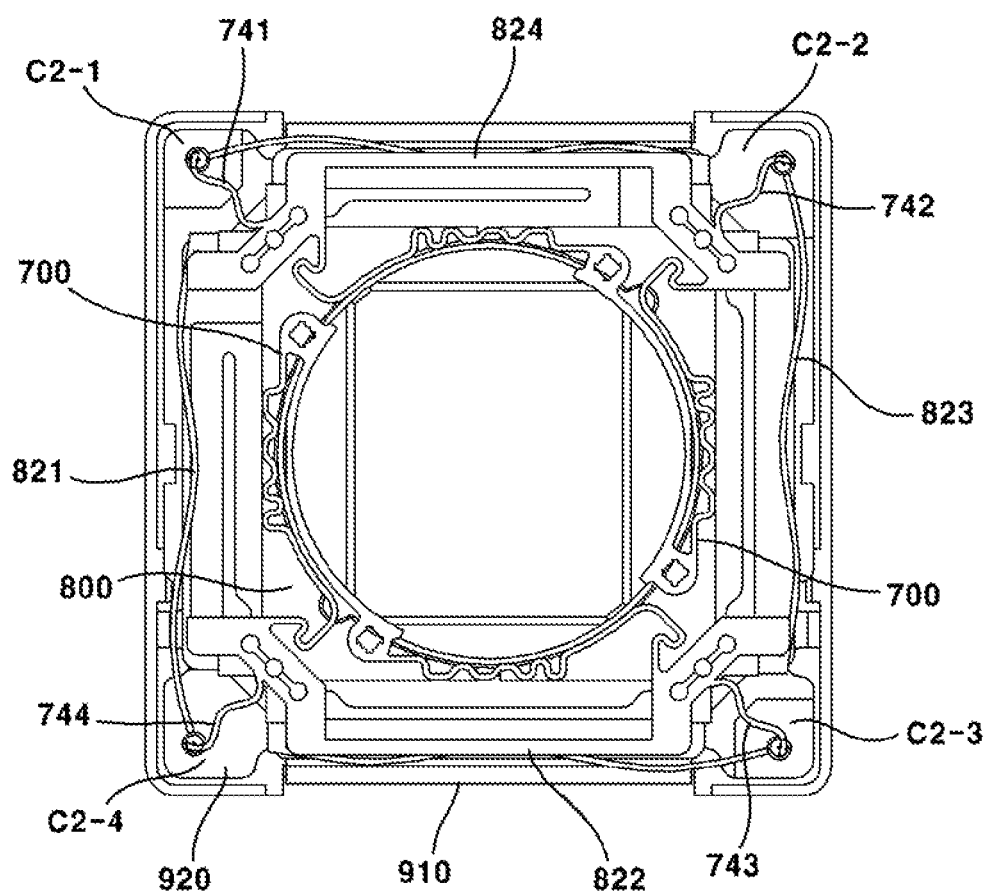
FIG. 15 is a plan view showing a support elastic member, a lower elastic member, and a base unit applied to the third embodiment.

Hereinafter, the lens driving device 3000 of the third embodiment will be described with reference to the drawings. FIG. 6 is an exploded perspective view showing the lens driving device of the third embodiment, and FIG. 15 is a plan view of the support elastic member, the lower elastic member, and the base unit applied to the third embodiment. In the lens driving device 3000 of the third embodiment, both the lower elastic member 700 and the support elastic member 800 exist. In addition, technical features of the lens driving device 1000 of the first embodiment and the lens driving device 2000 of the second embodiment may be inferred and applied.

The lower elastic member 700 may be disposed above the support elastic member 800, and the support elastic member 800 may be disposed below the lower elastic member 700.

On the other hand, the lower elastic member 700 and the support elastic member 800 may be electrically connected. The second-first connecting portion 741 and the fourth extension portion 824 may contact each other at the first corner C2-1 of the first substrate 920 to be electrically connected to each other. The second-second connecting portion 742 and the third extension portion 823 may contact each other at the second corner C2-2 of the first substrate 920 to be electrically connected to each other. The second connecting portion 743 and the second extension portion 822 may contact each other at the third corner C2-3 of the first substrate 920 to be electrically connected to each other. The second-fourth connecting portion 744 and the first extension portion 821 may be electrically connected to each other by contacting the fourth corner C2-4 of the first substrate 920.

In this case, there may be a total of four conductive lines. First, the first coil 500 and the lower elastic member 700 may be electrically connected, and the lower elastic member 700 and the first substrate 920 may be electrically connected. In this case, the first substrate 920 may apply power (current) to the first coil 500 through the lower elastic member 700. Second, the first coil 500 and the support elastic member 800 may be electrically connected, and the support elastic member 800 and the first substrate 920 may be electrically connected. In this case, the first substrate 920 may apply power (current) to the first coil 500 through the support elastic member 800. Third, the first coil 500 and the lower elastic member 700 may be electrically connected to each other, the lower elastic member 700 and the support elastic member 800 may be electrically connected to each other, and the support elastic member 800 and the first substrate 920 may be electrically connected to each other. In this case, the first substrate 920 may apply power (current) to the first coil 500 through the support elastic member 800 and the lower elastic member 700 sequentially. Fourth, the first coil 500 and the support elastic member 800 may be electrically connected, the support elastic member 800 and the lower elastic member 700 may be electrically connected, and the lower elastic member 700 and the first substrate 920 may be electrically connected to each other. In this case, the first substrate 920 may apply power (current) to the first coil 500 through the lower elastic member 700 and the support elastic member 800 sequentially.

In the lens driving device 3000 of the present embodiment, the housing 200 may be resiliently supported by the lower elastic member 700 and the support elastic member 800. In addition, the bobbin 400 may be resiliently supported by the lower elastic member 700 and the upper elastic member 600. The support elastic member 800 and the lower elastic member 700 may complement each other to secure a resilient supporting force for the housing 200, and the lower elastic member 700 and the upper elastic member 600 may complement each other to secure a supporting force for the bobbin 400. Therefore, both the housing 200 and the bobbin 400 can be stably supported.

Hereinafter, the lens driving device 4000 of the fourth embodiment and the lens driving device 5000 of the fifth embodiment will be described. In the fourth and fifth embodiments, wherein the position sensor 980 is present, the auto focus function is performed by detecting the position of the bobbin 400 and feeding it back, and thereby the quality of the auto focus function can be enhanced.

Figure 16:
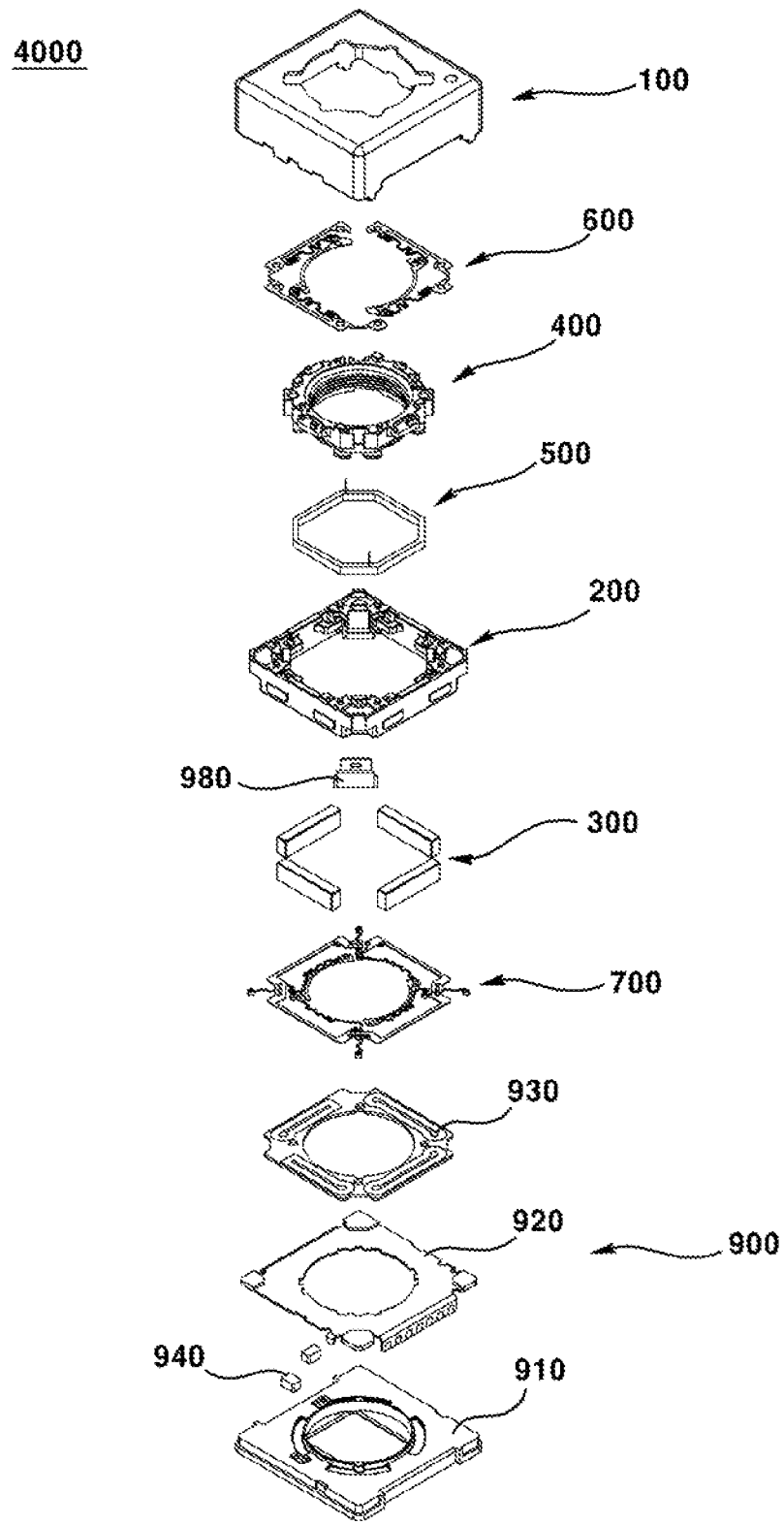
FIG. 16 is an exploded perspective view showing the lens driving device of the fourth embodiment.
Figure 18:
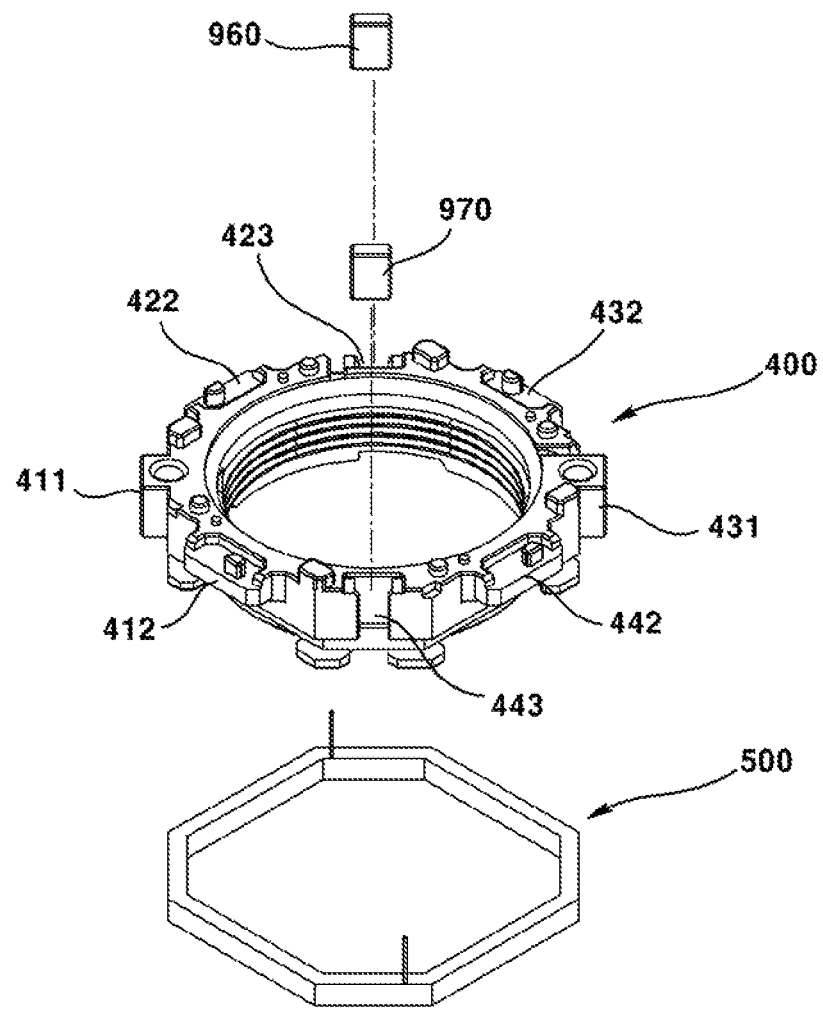
FIG. 18 is an exploded perspective view illustrating a bobbin, a first coil, a sensing magnet, and a compensation magnet applied to the fourth and fifth embodiments.
Figure 19:
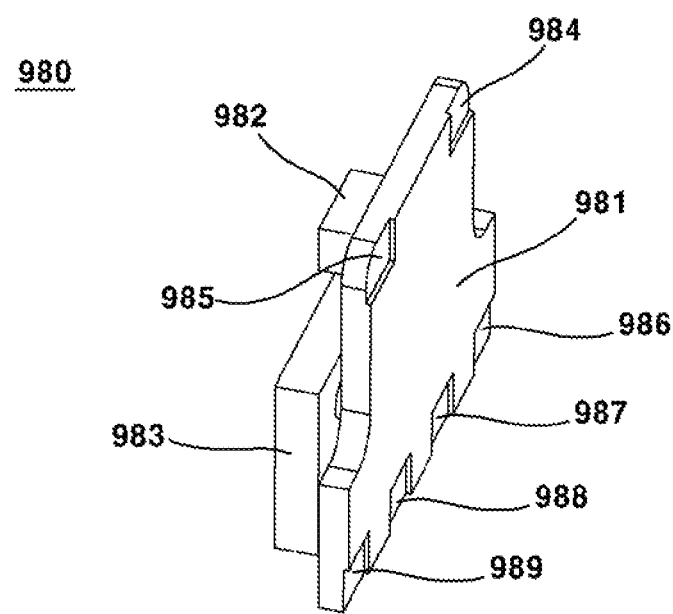
FIG. 19 is a perspective view showing a position sensor applied to the fourth and fifth embodiments.
Figure 20:
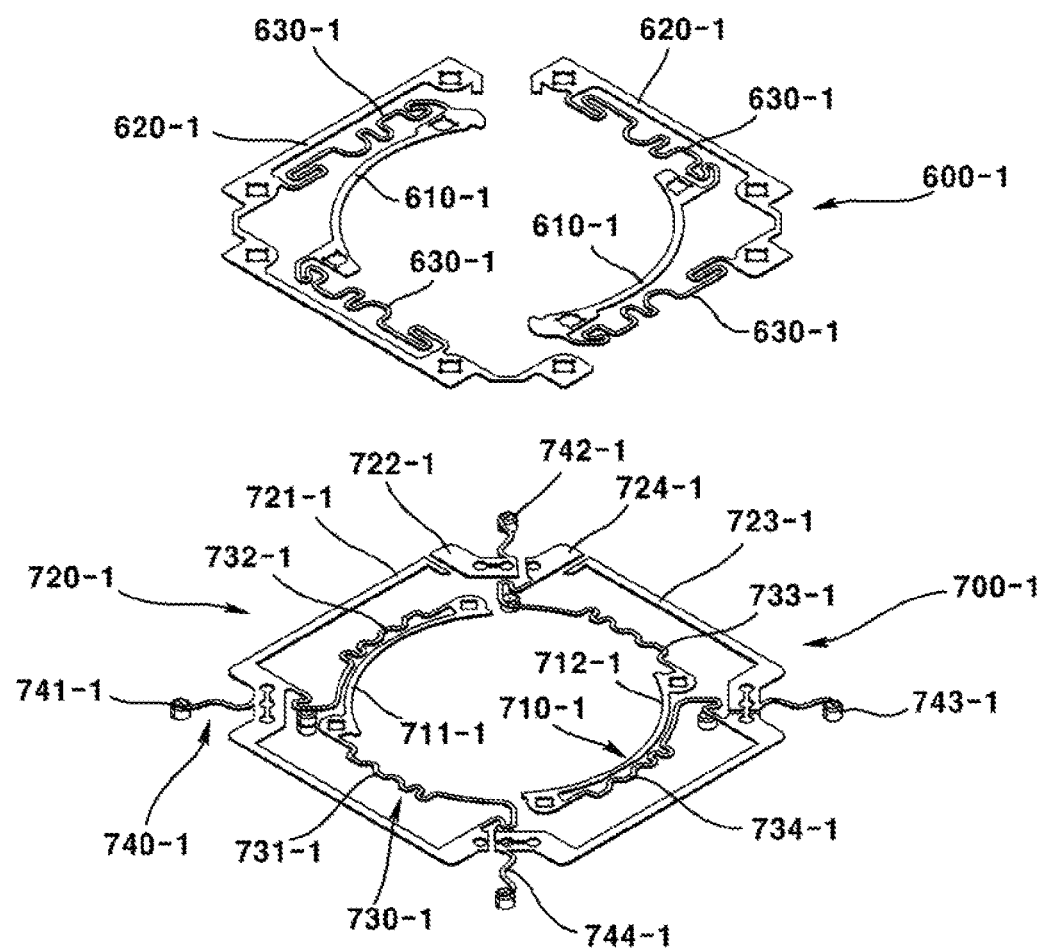
FIG. 20 is a perspective view showing an upper elastic member and a lower elastic member applied to the fourth and fifth embodiments.
Figure 21:
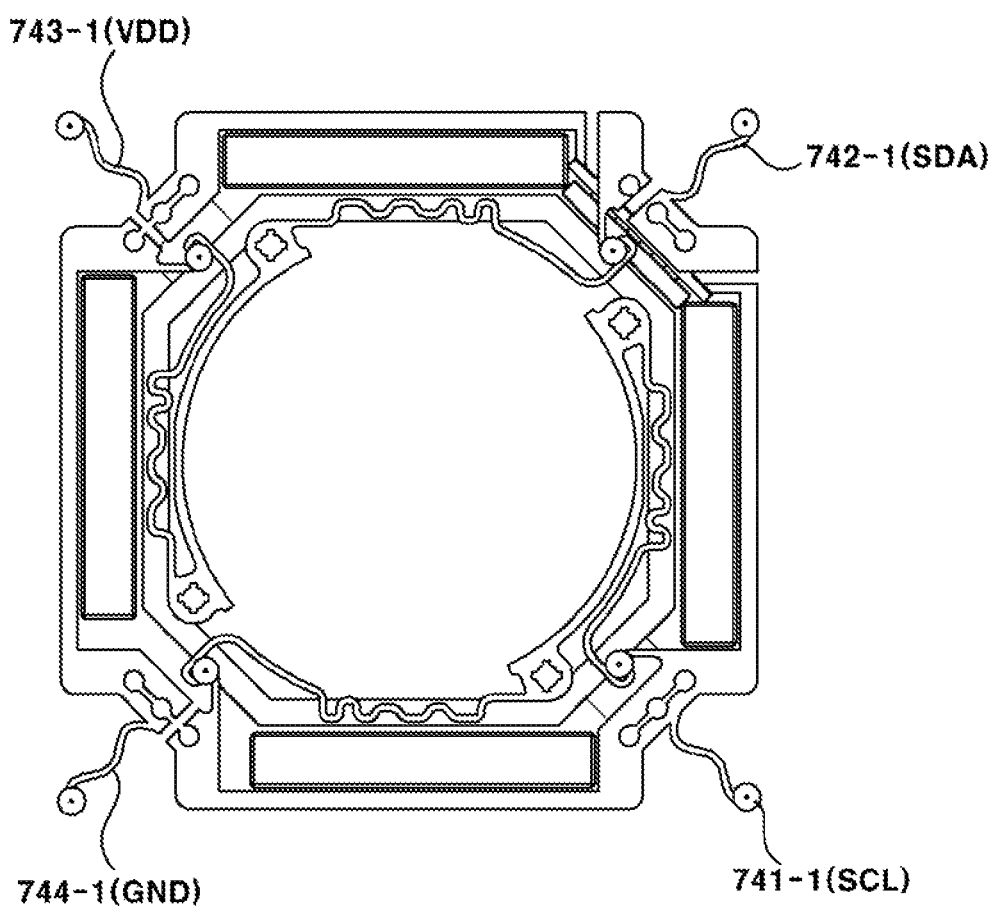
FIG. 21 is a bottom view showing a conductive line applied to the fourth and fifth embodiments.
Figure 22:
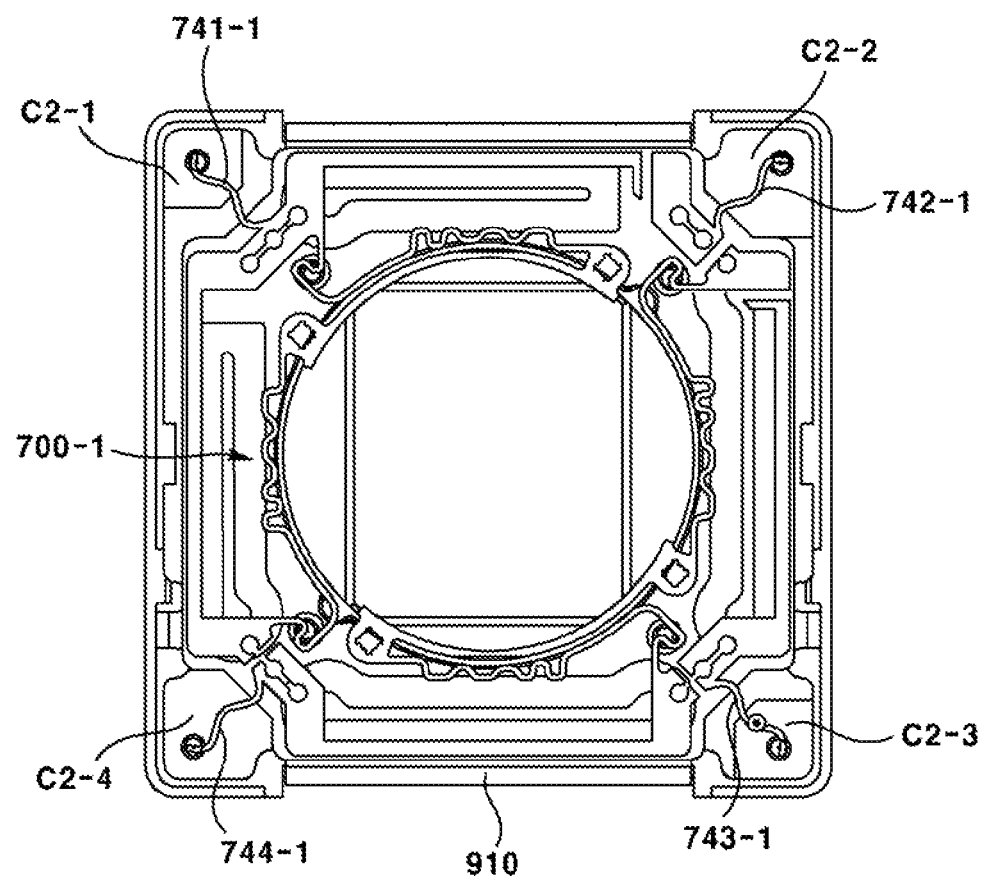
FIG. 22 is a plan view of the lower elastic member and the base unit of the fourth embodiment.
Figure 24:
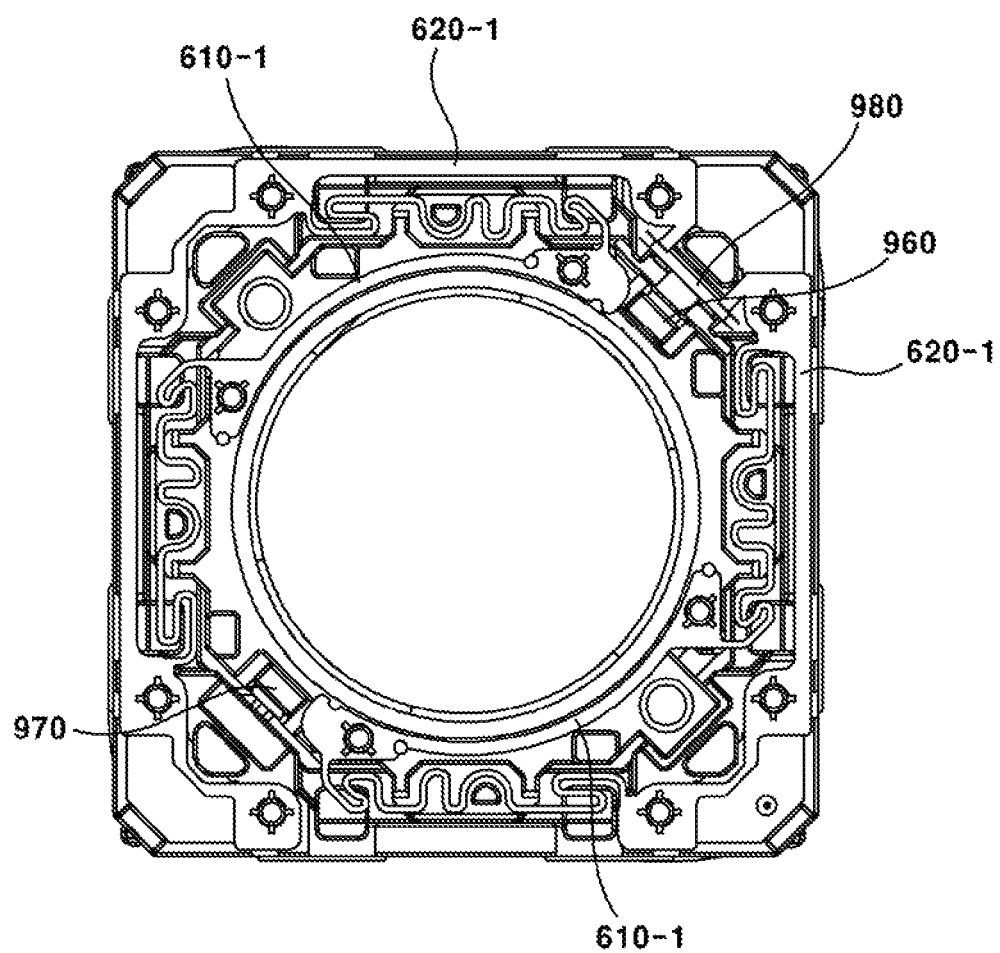
FIG. 24 is a plan view of the lens driving device with the cover removed in the fourth and fifth embodiments.
Figure 25:
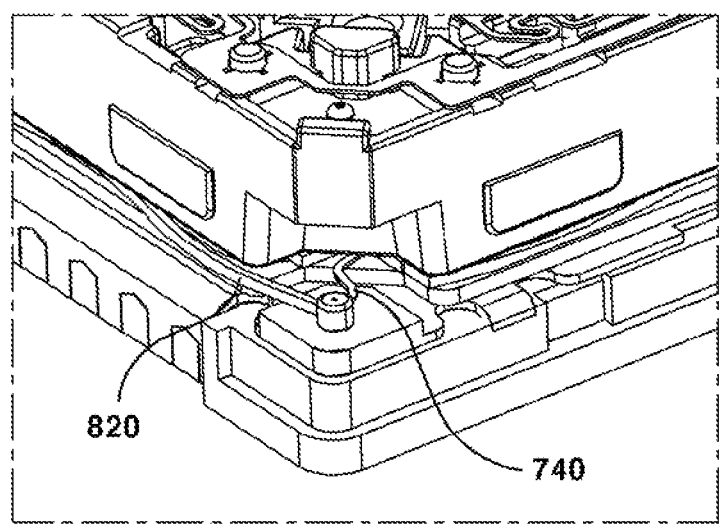
FIG. 25 is a perspective view and a conceptual view showing that the housing is subjected to a biasing force due to the slope of the connecting portion of the lower elastic member and the extension portion of the support elastic member in the first, second, third, fourth, and fifth embodiments.
Figure 25:
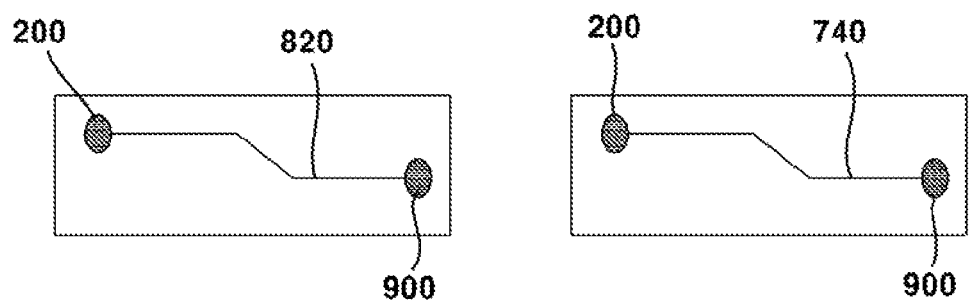
Figure 26:
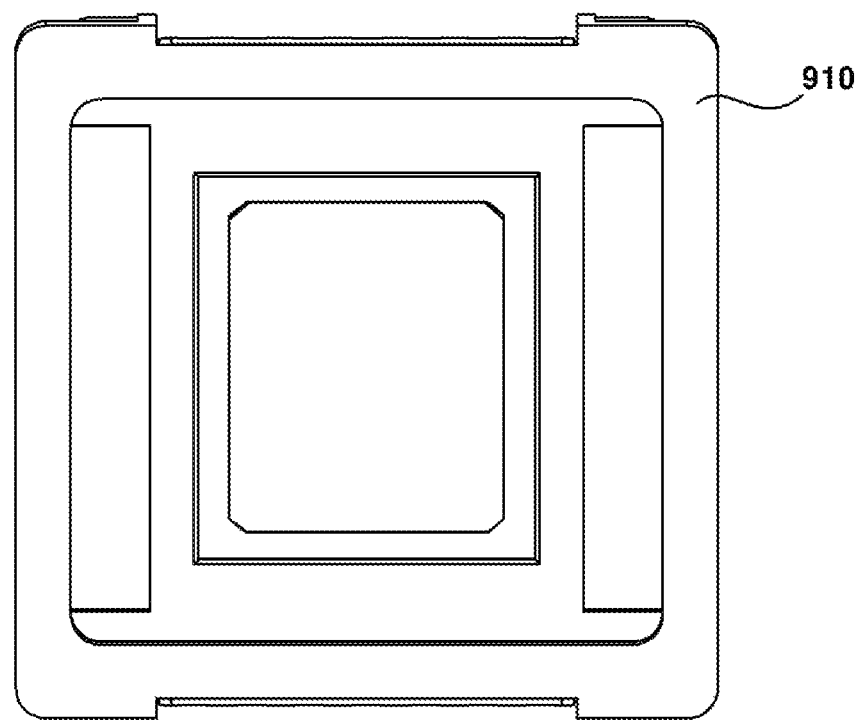
FIG. 26 is a bottom view of the base unit in the first, second, third, fourth, and fifth embodiments.

First, the lens driving device 4000 of the fourth embodiment will be described with reference to the drawings. FIG. 16 is an exploded perspective view showing the lens driving device of the fourth embodiment; FIG. 18 is an exploded perspective view showing the bobbin, the first coil, the sensing magnet and the compensation magnet applied to the fourth embodiment; FIG. 19 is a perspective view showing a position sensor applied to the fourth embodiment; FIG. 20 is a perspective view showing an upper elastic member and a lower elastic member applied to the fourth embodiment; FIG. 21 is a lower elastic member and a base unit of the fourth embodiment; FIG. 22 is a plan view showing the lower elastic member and the base unit of the fourth embodiment; and FIG. 24 is a plan view showing the lens driving device with the cover removed in the fourth embodiment.

The fourth embodiment may have substantially the same technical features as the first embodiment except that the sensing magnet 960, the compensation magnet 970 and the position sensor 980 is added, and the shape of the bobbin 400, the first coil 500, the upper elastic member 600 and the lower elastic member 700 is different. Therefore, the technical characteristics of the lens driving device 1000 of the first embodiment may be inferred and applied to the lens driving device 4000 of the fourth embodiment.

In the bobbin 400, unlike the first embodiment, instead of the second stopper 423, there may be a sensing magnet accommodating portion 423 formed inward at the outer circumferential surface of the bobbin 400 at that position. In addition, instead of the fourth stopper 442, there may be a compensation magnet accommodating portion 443 formed inward from the outer circumferential surface of the bobbin 400 at that position. The sensing magnet 960 may be disposed in the sensing magnet accommodating portion 423. A compensation magnet 970 may be disposed in the compensation magnet accommodating portion 443.

The sensing magnet accommodating portion 423 and the compensation magnet accommodating portion 443 may be spaced apart from the coil 500 upwardly. The sensing magnet accommodating portion 423 and the compensation magnet accommodating portion 443 may be disposed not to face the driving magnet 300. The sensing magnet accommodating portion 423 and the compensation magnet accommodating portion 443 may be symmetrically disposed around the optical axis.

Unlike the first embodiment, the first coil 500 may be electrically connected to the upper elastic member 600. That is, the first coil 500 may receive power (current) through the upper elastic member 600. Therefore, one end portion and the other end portion of the first coil 500 may be extended upward.

An upper elastic member 600-1 may include an inner resilient portion 610-1, an outer resilient portion 620-1, and a connecting resilient portion 630-1. The inner resilient portion 610-1 may be disposed on the bobbin 400. The inner resilient portion 610-1 may be coupled to the upper surface of the bobbin 400. Further, the inner resilient portion 610-1 may be electrically connected to the first coil 500. One end portion and the other end portion of the first coil 500 may be soldered to the inner resilient portion 610-1. The outer resilient portion 620-1 may be disposed on the housing 200. The outer resilient portion 620-1 may be coupled to the upper surface of the housing 200. The outer resilient portion 620-1 may be electrically connected to a first sensor terminal 984 and a second sensor terminal 985 of the position sensor 980. The outer resilient portion 620-1 may be soldered to the first sensor terminal 984 and the second sensor terminal 985. The connecting resilient portion 630-1 may be disposed between the inner resilient portion 610-1 and the outer resilient portion 620-1. The connecting resilient portion 630-1 may be four. The four connecting resilient portions 630-1 may be spaced apart from each other. Curvature may be formed in the connecting resilient portion 630-1 in various directions.

In the lens driving device 4000 of the fourth embodiment, unlike the lens driving device 1000 of the first embodiment, the upper elastic member 600-1 must include a first upper elastic member and a second upper elastic member spaced apart from each other. One inner resilient portion 610-1, one outer resilient portion 620-1, and two connecting resilient portions 630-1 may be located on the first upper elastic member. One inner resilient portion 610-1, one outer resilient portion 620-1, and two connecting resilient portions 630-1 may be located in the second upper elastic member. The inner resilient portion 610-1 located in the first upper elastic member may be electrically connected to one end portion of the first coil 500, and the outer resilient portion 620-1 located in the first upper elastic member may be electrically connected to the first sensor terminal 984. The inner resilient portion 610-1 located in the second upper elastic member may be electrically connected to the other end portion of the first coil 500. The outer resilient portion 610-1 located in the second upper elastic member may be electrically connected to the second sensor terminal 985. Driving power (current) of the first coil 500 may be applied to the first sensor terminal 984 and the second sensor terminal 985.

The lower elastic member 700-1 of the fourth embodiment may not be electrically connected to the first coil 500, unlike the lower elastic member 700 of the first embodiment. The lower elastic member 700-1 may be electrically connected to the position sensor 980. In this case, the lower elastic member 700-1 may be electrically connected to the third sensor terminal 986, the fourth sensor terminal 987, the fifth sensor terminal 988, and the sixth sensor terminal 989 of the position sensor 980. The lower elastic member 700-1 may be electrically connected to the first substrate 920.

The lower elastic member 700-1 may be separated into a first lower elastic member, a second lower elastic member, a third lower elastic member, and a fourth lower elastic member spaced apart from each other. That is, the lower elastic member 700-1 may be formed of four members spaced apart from each other. The first lower elastic member, the second lower elastic member, the third lower elastic member, and the fourth lower elastic member may be electrically connected to a third sensor terminal 986, a fourth sensor terminal 987, a fifth sensor terminal 988, and a six sensor terminal 989, respectively. In addition, the first lower elastic member may be electrically connected to the first corner C2-1 of the first substrate 920. The second lower elastic member may be electrically connected to the second corner C2-2 of the first substrate 920. The third lower elastic member may be electrically connected to the third corner C2-3 of the first substrate 920. The fourth lower elastic member may be electrically connected to the fourth corner C2-4 of the first substrate 920. That is, the position sensor 980 and the first substrate 920 may be electrically connected through the lower elastic member 700-1.

The lower elastic member 700-1 may comprise a first coupling portion 710-1, a second coupling portion 720-1, a first connecting portion 730-1, and a second connecting portion 740-1.

The first coupling portion 710-1 may be located inside the second coupling portion 720-1. The first coupling portion 710-1 may be located below the bobbin 400. The first coupling portion 710-1 may be coupled to the bottom surface of the bobbin 400. The first coupling portion 710-1 may be electrically connected to the first coil 500.

The first coupling portion 710-1 may comprise a 1-1 coupling portion 711-1 and a 1-2 coupling portion 712-1 that are spaced apart from each other. In this case, the 1-1 coupling portion 711-1 may be located in the first lower elastic member, and the 1-2 coupling portion 712-1 may be located in the fourth lower elastic member.

The second coupling portion 720-1 may be located outer side of the first coupling portion 710-1. The second coupling portion 720-1 may be located lower side the housing 400. The second coupling portion 720-1 may be coupled to the lower surface of the housing 400.

The second coupling portion 720-1 may comprise a 2-1 coupling portion 721-1, a 2-2 coupling portion 722-1, a 2-3 coupling portion 723-1, and a 2-4 coupling portion 724-1, which are spaced apart from each other. In this case, the 2-1 coupling portion 721-1 may be located in the first lower elastic member, the 2-2 coupling portion 722-1 may be located in the second lower elastic member, the 2-3 coupling portion 723-1 may be located in the third lower elastic member, and the 2-4 coupling portion 724-1 may be located on the fourth lower elastic member.

The 2-1 coupling portion 721-1, the 2-2 coupling portion 722-1, the 2-3 coupling portion 723-1, and the 2-4 coupling portion 724-1 may be electrically connected by being soldered with the third sensor terminal 986, the fourth sensor terminal 987, the fifth sensor terminal 988, and the sixth sensor terminal 989 of the position sensor 890, respectively.

The first connecting portion 730-1 may be located between the first coupling portion 710-1 and the second coupling portion 720-1. The first connecting portion 730-1 may resiliently connect the first coupling portion 710-1 and the second coupling portion 720-1. That is, the first connecting portion 730-1 may resiliently connect the housing 200 and the bobbin 400. The first connecting portion 730-1 may be extended from the corners C1-1, C1-2, C1-3, and C1-4 to the first coupling portion 710-1. In this case, the first connecting portion 730-1 may be curved in various directions. This is to increase the resilient force.

The first connecting portion 730-1 may comprise a 1-1 connecting portion 731-1, a 1-2 connecting portion 732-1, a 1-3 connecting portion 733-1, and a 1-4 connecting portion 734-1, which are spaced apart from each other. The 1-1 connecting portion 731-1 and the 1-2 connecting portion 732-1 may be located in the first lower elastic member, and the 1-3 connecting portion 733-1 and the 1-4 connecting portion 734-1 may be located in the fourth lower elastic member.

The second connecting portion 740-1 may be located outer side of the second coupling unit 720-1. The second connecting portion 740-1 may resiliently connect the housing 200 and the base unit 900. As a result, the lower elastic member 700-1 may resiliently support the housing 200.

The second connecting portion 740-1 may comprise a second connecting portion 741-1, a second connecting portion 741-2, a second connecting portion 741-3, and a second connecting portion 741-4. The second-first connecting portion 741-1 may be located at the first lower elastic member, the second-second connecting portion 742-1 may be located at the second lower elastic member, the second-third connecting portion 743-1 may be located at the third lower elastic member, and the second-fourth connecting portion 744-1 may be located at the fourth lower elastic member. Other than this, for the arrangement, coupling relationship, and electrical connection relationship of the second-first connecting portion 741-1, the second-second connecting portion 741-2, the second-third connecting portion 741-3, and the second-fourth connecting portion 741-4, the arrangement, coupling relationship, and electrical connection relationship of the second-first connecting portion 741, the second-second connecting portion 741, the second-third connecting portion 741, and the second-fourth connecting portion 741 of the lens driving device 1000 of the first embodiment may be applied mutatis mutandis.

The sensing magnet 960 may be disposed on an outer circumferential surface of the bobbin 400. The sensing magnet 960 may be disposed spaced apart from the coil 500 upwardly. The sensing magnet 960 may be disposed to face the position sensor 980. The sensing magnet 960 may be disposed in the sensing magnet accommodating portion 423 of the bobbin 400. The magnetic force of the sensing magnet 960 may be sensed by the position sensor 980. Therefore, the sensing magnet 960 may be a magnet for determining the position of the bobbin 400.

The compensation magnet 970 may be disposed on the outer circumferential surface of the bobbin 400. The compensation magnet 970 may be disposed spaced apart from the coil 500 upwardly. The compensation magnet 970 may be disposed in the compensation magnet accommodating portion 443 of the bobbin 400. The compensation magnet 970 may be a magnet for compensating for the mass deviation or magnetic force deviation generated in the bobbin 400 by the sensing magnet 960. Thus, the compensation magnet 970 can be disposed opposite the sensing magnet 960 (and vice versa). The compensation magnet 970 and the sensing magnet 960 may be symmetrically disposed with respect to the center of gravity of the bobbin 400. The compensation magnet 970 and the sensing magnet 960 may be symmetrically disposed around the optical axis.

The position sensor 980 may be disposed in the housing 200. The position sensor 980 may be disposed spaced apart from the magnet 300. The position sensor 980 may be disposed in the second corner C1-2 of the housing 200. The position sensor 980 may be disposed in the second accommodating portion 221 of the housing 200. The position sensor 980 may be electrically connected to the upper elastic member 600. The position sensor 980 may be electrically connected to the lower elastic member 700.

The position sensor 980 may comprise a sensor substrate 981, a detection sensor 982, an IC circuit chip 983, a first sensor terminal 984, a second sensor terminal 985, a third sensor terminal 986, a fourth sensor terminal 987, a fifth sensor terminal 988, and a sixth sensor terminal 989. The sensor substrate 981 may be a third substrate.

The detection sensor 982 and the IC circuit chip 983 may be mounted on one side surface of the sensor substrate 981, and the first sensor terminal 984, the second sensor terminal 985, the third sensor terminal 986, the fourth sensor terminal 987, the fifth sensor terminal 988, and the sixth sensor terminal 989 may be formed on the other side surface of the sensor board 981.

The detection sensor 982 may be disposed to face the sensing magnet 960. The detection sensor 982 may output the location information of the bobbin 400 by detecting a change in the magnetic force of the sensing magnet 960. The control unit of the camera module 10 can perform a precise autofocus function by adjusting the intensity, direction, wavelength, and the like of the power (current) applied to the first coil 500 according to the position information of the bobbin 400 outputted from the detection sensor 982 (feedback control).

The IC circuit chip 983 may perform various control functions in place of the control unit of the camera module 10. The first sensor terminal 984 and the second sensor terminal 985 may be electrically connected to the upper elastic member 600. The first sensor terminal 984 and the second sensor terminal 985 may be terminals for applying power to the first coil 500. The third sensor terminal 986, the fourth sensor terminal 987, the fifth sensor terminal 988, and the sixth sensor terminal 989 may be electrically connected to the lower elastic member 600. The third sensor terminal 986, the fourth sensor terminal 987, the fifth sensor terminal 988, and the sixth sensor terminal 989 may be terminals for transmitting total supply power or electronic driving and communication signals. The IC circuit chip 983 may be a driver IC. The driver IC may be a Hall sensor integrated driver IC with a built-in Hall sensing function (magnetic force sensing function of the magnet).

In the fourth embodiment, power (current) may be applied to the first coil 500 from the first substrate 910 sequentially through the lower elastic member 700, the position sensor 980, and the upper elastic member 600. In this case, the power (current) applied to the first coil 500 may be controlled by the IC circuit chip 983 of the position sensor 980.

Figure 17:
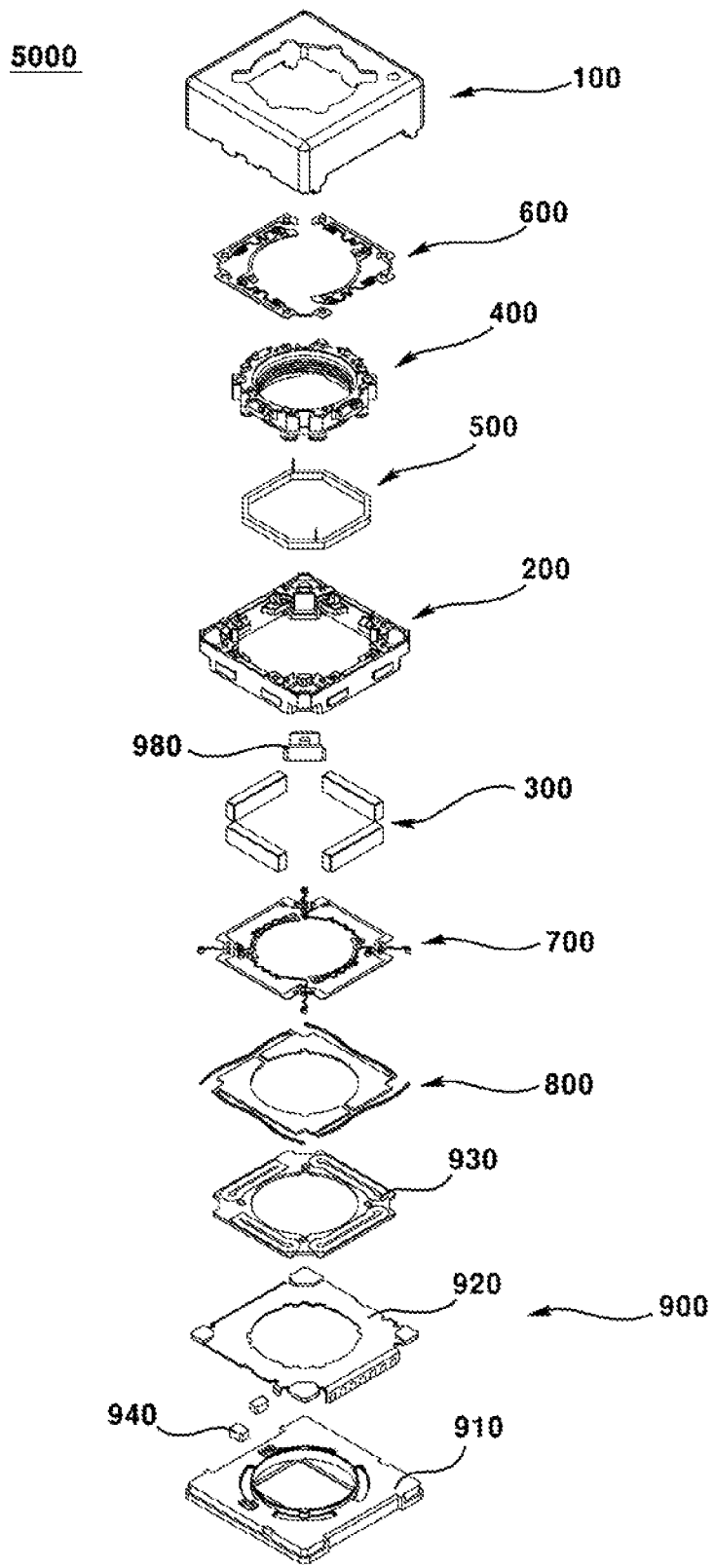
FIG. 17 is an exploded perspective view showing the lens driving device of the fifth embodiment.
Figure 23:
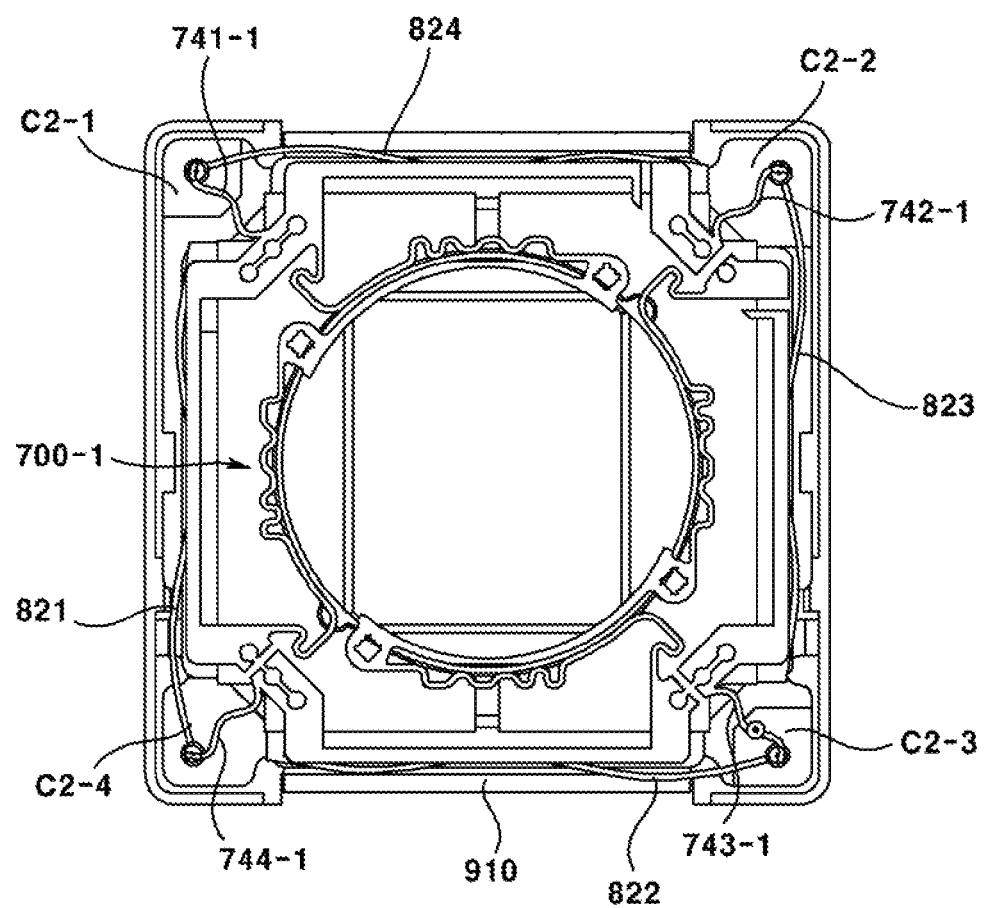
FIG. 23 is a plan view of the support elastic member, the lower elastic member, and the base unit of the fifth embodiment.

A lens driving device 5000 of the fifth embodiment will be described with reference to the drawings. FIG. 17 is an exploded perspective view showing the lens driving device of the fifth embodiment; FIG. 18 is an exploded perspective view illustrating a bobbin, a first coil, a sensing magnet, and a compensation magnet applied to the fifth embodiment; FIG. 19 is a perspective view showing a position sensor applied to the fourth and fifth embodiments of the present invention; FIG. 20 is a perspective view showing an upper elastic member and a lower elastic member applied to the fourth and fifth embodiments; FIG. 21 is a bottom view showing a conductive line applied to the fifth embodiment; and FIG. 23 is a plan view of the support elastic member, the lower elastic member, and the base unit of the fifth embodiment.

The technical features of the lens driving device 4000 of the fourth embodiment 4000 may be inferred and applied to the fifth embodiment including the addition of the support elastic member 800. In addition, the technical features of the support elastic members 800 of the second and third embodiments may be inferred and applied to the support elastic member 800 of the fifth embodiment.

However, since the lower elastic member 700 performs an important function in the conductive line when compared with the second embodiment and the third embodiment, the support elastic member 800 may not be electrically connected to the first substrate 920, and the lower elastic member 700 and the support elastic member 800 may not be electrically connected.

In the fourth embodiment and the fifth embodiment, the lens driving devicees 4000 and 5000 have an advantage that the feedback control is possible by the position sensor 980.

In the above description, all components constituting the embodiments of the present invention are described as being combined or operating in combination, but the present invention is not necessarily limited to the embodiments. In other words, within the scope of the purpose of this invention, all of those components may operate in selective combinations of one or more components. In addition, the term "include", "comprise", or "have" described above means that the corresponding components can be embedded unless there is an opposite description therefore it should be interpreted that other components may further be comprised in addition to those corresponding components. All terms, including technical and scientific terms, have the same meaning as commonly understood by one of ordinary skill in the art to which this invention belongs, unless otherwise defined. Commonly used terms, such as predefined terms, should be interpreted to be consistent with the contextual meanings of the related art, and are not to be construed as ideal or excessively formalistic, unless expressly defined to the contrary.

The above description is only to those described as the technical idea of the present invention by way of example, and those skilled in the art will appreciate that various modifications and variations can be made without departing from the essential features of the present invention. Therefore, the embodiments disclosed in the present invention are not intended to limit the technical idea of the present invention but to describe the present invention, and the scope of the technical idea of the present invention is not limited by these embodiments. The protection scope of the present invention should be interpreted by the following claims, and all technical ideas within the equivalent scope should be interpreted as being included in the scope of the present invention.

The invention claimed is:

1. A lens driving device comprising:
 a base;
 a housing disposed on the base;
 a bobbin disposed in the housing;
 a first coil disposed on the bobbin;
 a magnet disposed on the housing and facing the first coil;
 a substrate disposed on the base and comprising a second coil facing the magnet;
 an upper elastic member coupled to an upper surface of the bobbin and an upper surface of the housing;
 a lower elastic member coupled to a lower surface of the bobbin and a lower surface of the housing;
 a sensing magnet disposed on the bobbin;
 a sensor substrate disposed on the housing; and
 a sensor disposed on the sensor substrate and configured to sense the sensing magnet,
 wherein the lower elastic member comprises a first coupling portion coupled to the lower surface of the bobbin, a second coupling portion coupled to the lower surface of the housing, a first connecting portion connecting the first coupling portion and the second coupling portion, and a second connecting portion extending from the second coupling portion and coupled to the substrate,
 wherein the lower elastic member electrically connects the sensor substrate and the substrate, and
 wherein, in an optical axis direction, a length of the second connecting portion is shorter than a distance between the upper elastic member and the substrate.

2. The lens driving device of claim 1, wherein the second connecting portion comprises second-first and second-third connecting portions opposite to each other, and second-second and second-fourth connecting portions opposite to each other,
   wherein the second-first and second-third connecting portions are disposed on a first axis perpendicular to an optical axis, and
   wherein the second-second and second-fourth connecting portions are disposed on a second axis perpendicular to the optical axis and the first axis.

3. The lens driving device of claim 2, wherein the second-first, second-second, second-third, and second-fourth connecting portions are connected to four corners of the substrate, respectively.

4. The lens driving device of claim 2, wherein the second-first connecting portion and the second-third connecting portion are symmetrical each other with respective to the optical axis, and
   wherein the second-second connecting portion and the second-fourth connecting portion are symmetrical each other with respective to the optical axis.

5. The lens driving device of claim 2, wherein the substrate comprises first to fourth corners,
   wherein the housing comprises a first corner corresponding to the first corner of the substrate, a second corner corresponding to the second corner of the substrate, a third corner corresponding to the third corner of the substrate, and a fourth corner corresponding to the fourth corner of the substrate, and
   wherein the second-first connecting portion connects the first corner of the housing and the first corner of the substrate, the second-second connecting portion connects the second corner of the housing and the second corner of the substrate, the second-third connecting portion connects the third corner of the housing and the third corner of the substrate, and the second-fourth connecting portion connects the fourth corner of the housing and the fourth corner of the substrate.

6. The lens driving device of claim 1, wherein the second connecting portion supports a movement of the housing in a direction perpendicular to an optical axis.

7. The lens driving device of claim 1, wherein the second connecting portion comprises a curved shape formed by bending at least twice.

8. The lens driving device of claim 1, wherein the substrate comprises a first substrate disposed on the base and a second substrate disposed on the first substrate and comprising the second coil.

9. The lens driving device of claim 1, wherein the second connecting portion of the lower elastic member is not overlapped with the upper elastic member in a direction perpendicular to an optical axis, and
   wherein the second connecting portion of the lower elastic member is not electrically connected with the upper elastic member.

10. The lens driving device of claim 1, wherein the upper elastic member comprises two upper elastic members,
    wherein the sensor substrate comprises two upper terminals disposed on an upper portion of the sensor substrate, and
    wherein the two upper elastic members electrically connect the first coil and the two upper terminals of the sensor substrate.

11. A camera module comprising:
    a printed circuit board;
    an image sensor disposed on the printed circuit board;
    a lens driving device of claim 1; and
    a lens coupled to the bobbin of the lens driving device.

12. An optical apparatus comprising a camera module of claim 11.

13. The lens driving device of claim 1, wherein the lower elastic member comprises four lower elastic members spaced apart from each other.

14. The lens driving device of claim 13, wherein the sensor substrate comprises four lower terminals disposed on a lower portion of the sensor substrate, and
    wherein the four lower elastic members electrically connect the substrate and the four lower terminals of the sensor substrate.

15. The lens driving device of claim 1, wherein the second connecting portion of the lower elastic member is spaced apart from the upper elastic member, and
    wherein the second connecting portion of the lower elastic member is directly coupled with the substrate.

16. A lens driving device comprising:
    a base;
    a housing disposed on the base;
    a bobbin disposed in the housing;
    a first coil disposed on the bobbin;
    a magnet disposed on the housing and facing the first coil;
    a first substrate disposed on the base and comprising a second coil facing the magnet;
    an upper elastic member coupled to an upper surface of the bobbin and an upper surface of the housing;
    a lower elastic member coupled to a lower surface of the bobbin and a lower surface of the housing; and
    a second substrate disposed on the housing,
    wherein the lower elastic member comprises a first coupling portion coupled to the lower surface of the bobbin, a second coupling portion coupled to the lower surface of the housing, a first connecting portion connecting the first coupling portion and the second coupling portion, and a second connecting portion extending from the second coupling portion and coupled to the first substrate,
    wherein the lower elastic member electrically connects the first substrate and the second substrate, and
    wherein, in an optical axis direction, a length of the second connecting portion is shorter than a distance between the upper elastic member and the first substrate.

17. The lens driving device of claim 16, wherein the lower elastic member is configured to support a movement of the housing in a direction perpendicular to an optical axis.

18. The lens driving device of claim 16, comprising a sensor disposed on the second substrate and configured to sense a movement of the bobbin.

19. The lens driving device of claim 16, wherein the second connecting portion comprises second-first and second-third connecting portions opposite to each other, and second-second and second-fourth connecting portions opposite to each other, and
    wherein the second-first, second-second, second-third and second-fourth connecting portions are connected to four corners of the first substrate, respectively.

20. A lens driving device comprising:
    a base;
    a housing disposed on the base;
    a bobbin disposed in the housing;
    a first coil disposed on the bobbin;
    a magnet disposed on the housing and facing the first coil;
    a first substrate disposed on the base and comprising a second coil facing the magnet; and an upper elastic member coupled to an upper surface of the bobbin and an upper surface of the housing;
a lower elastic member coupled to a lower surface of the bobbin and a lower surface of the housing;
a sensing magnet disposed on the bobbin;
a second substrate disposed on the housing; and
a sensor disposed on the second substrate and configured to sense the sensing magnet,
wherein the lower elastic member comprises a first coupling portion coupled to the lower surface of the bobbin, a second coupling portion coupled to the lower surface of the housing, a first connecting portion connecting the first coupling portion and the second coupling portion, and a second connecting portion extending from the second coupling portion and coupled to the first substrate,
wherein the lower elastic member comprises four lower elastic members spaced apart from each other,
wherein the four lower elastic members electrically connect the first substrate and the second substrate, and
wherein, in an optical axis direction, a length of the second connecting portion is shorter than a distance between the upper elastic member and the first substrate.

* * * * *